(12) United States Patent
Yang et al.

(10) Patent No.: US 12,719,731 B2
(45) Date of Patent: Aug. 25, 2026

(54) EMBEDDED CONSTELLATION

(71) Applicant: QUALCOMM Incorporated, San Diego, CA (US)

(72) Inventors: Wei Yang, San Diego, CA (US); Pinar Sen, San Diego, CA (US); Mahmoud Taherzadeh Boroujeni, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 0 days.

(21) Appl. No.: 18/898,063

(22) Filed: Sep. 26, 2024

(65) Prior Publication Data

US 2026/0089047 A1 Mar. 26, 2026

(51) Int. Cl.
*H04L 27/36* (2006.01)
*H04L 27/38* (2006.01)

(52) U.S. Cl.
CPC ............ *H04L 27/362* (2013.01); *H04L 27/38* (2013.01)

(58) Field of Classification Search
None
See application file for complete search history.

(56) References Cited

U.S. PATENT DOCUMENTS 4,520,492 A * 5/1985 Weber ..................... H04L 27/22 375/346
5,237,292 A * 8/1993 Chethik ................ H04L 27/368 375/261
5,381,449 A * 1/1995 Jasper ................. H04L 25/0226 375/298
5,477,199 A * 12/1995 Montreuil ........... H04L 27/0008 375/321
5,491,457 A * 2/1996 Feher ...................... H04L 27/38 375/302
5,966,412 A * 10/1999 Ramaswamy ...... H04L 27/3488 375/261
(Continued)

FOREIGN PATENT DOCUMENTS

AU 2009327618 A1 * 6/2010 ......... H04L 27/3405
CA 2734064 A1 * 2/2010 ............... H04L 5/04
(Continued)

OTHER PUBLICATIONS

A. K. S. Al-bayati and O. M. Aloquili, "Constellation-switching precoding for blind detection of co-channel signals: application to 8-ary signaling," in IEEE Transactions on Communications, vol. 57, No. 10, pp. 2891-2894, Oct. 2009, (Year: 2009).*
(Continued)

*Primary Examiner* — Berhanu Tadese
(74) *Attorney, Agent, or Firm* — Harrity & Harrity, LLP

(57) ABSTRACT

Various aspects of the present disclosure generally relate to wireless communication. In some aspects, a transmitter device may modulate a first set of bits into a first modulation symbol, selected from a first set of modulation points. The transmitter device may modulate a second set of bits into a second modulation symbol, selected from a second set of modulation points, where the first set of modulation points are a subset of the second set of modulation points. The transmitter device may transmit the first modulation symbol and the second modulation symbol to a receiver device. Numerous other aspects are described.

30 Claims, 13 Drawing Sheets

(56) References Cited

U.S. PATENT DOCUMENTS 5,987,071 A * 11/1999 Iwamatsu ............... H04L 27/38 455/61
6,002,721 A * 12/1999 Said ........................ H04L 27/38 329/304
6,091,781 A * 7/2000 Mujtaba .................. H04L 27/02 375/321
6,650,649 B1 * 11/2003 Muhammad ........ H04L 12/6418 370/402
6,804,309 B1 * 10/2004 Morelos-Zaragoza ...................... H04L 27/0012 375/322
6,928,101 B2 * 8/2005 Feher .................... H04L 27/362 375/261
7,078,981 B2 * 7/2006 Farag ........................ H04L 5/12 375/298
7,095,290 B2 * 8/2006 Hakkinen ............. H04L 27/362 380/268
7,230,993 B2 * 6/2007 Ruotsalainen ........ H04L 27/361 370/207
7,254,180 B1 * 8/2007 Oelcer ................ H04L 27/2614 375/261
7,308,047 B2 * 12/2007 Sadowsky ............. H04L 25/067 375/324
7,310,379 B2 * 12/2007 Sibecas .................... H04B 7/10 375/267
7,362,802 B2 * 4/2008 Saed ................. H04L 25/03159 375/232
7,496,146 B2 * 2/2009 Oshima ................ H04N 21/631 375/280
7,545,232 B2 * 6/2009 Boos .................... H03C 3/0925 332/146
7,570,699 B2 * 8/2009 Jin ...................... H04L 27/3433 375/261
7,675,962 B2 * 3/2010 Mergen ............... H04L 25/0218 375/147
7,680,213 B2 * 3/2010 Mantyla ................ H04L 27/362 375/308
7,706,437 B2 * 4/2010 Saed ................. H04L 25/03159 375/232
7,729,232 B2 * 6/2010 Wang .................... H04W 52/42 375/267
7,733,968 B2 * 6/2010 Ling .................... H04B 17/391 375/260
7,734,303 B2 * 6/2010 Krishnamoorthi .......................... H04L 25/0232 370/335
7,773,697 B2 * 8/2010 Dibiaso ................... H04L 27/38 375/330
8,027,286 B2 * 9/2011 Khan .................. H04L 27/3488 375/261
8,064,545 B2 * 11/2011 Bock ................... H04L 27/0012 375/329
8,102,930 B2 * 1/2012 Huang ............. H04L 25/03292 375/261
8,249,190 B2 * 8/2012 Seller .................. H04L 27/3405 375/267
8,306,145 B2 * 11/2012 Scarpa .................. H04L 5/0007 375/283
8,369,449 B2 * 2/2013 Seyedi-Esfahani ......................... H04L 27/3416 375/295
8,391,411 B2 * 3/2013 Miyoshi ................ H04L 1/0042 375/329
8,462,615 B2 * 6/2013 Murakami ............ H04L 27/227 370/215
8,605,824 B2 * 12/2013 Miyoshi ................ H04L 27/183 375/329
8,879,667 B2 * 11/2014 Chen ................. H04W 52/0258 375/261
8,886,055 B1 * 11/2014 Morero ................. H04L 1/0045 398/208
8,891,661 B2 * 11/2014 Seier ....................... H04L 1/007 375/269
8,908,799 B2 * 12/2014 Qu ......................... H04L 27/02 375/299
8,923,429 B2 * 12/2014 Scarpa .................. H04L 5/0007 375/283
8,983,005 B2 * 3/2015 Lee ........................ H04L 27/38 375/329
9,049,084 B1 * 6/2015 Cope ....................... H04L 27/20
9,178,740 B1 * 11/2015 Kroeger .............. H04L 27/3809
9,203,519 B2 * 12/2015 Yaman ................. H04B 10/516
9,338,042 B1 * 5/2016 Gerdes .................... H04L 27/38
9,413,584 B2 * 8/2016 Zhu ......................... H04L 27/38
9,426,014 B1 * 8/2016 Gerdes ................ H04L 27/2697
9,455,863 B1 * 9/2016 Gerdes .................... H04L 27/38
9,602,326 B2 * 3/2017 Park ...................... H04L 27/362
9,780,990 B2 * 10/2017 Zhang ................ H04B 10/5161
9,825,798 B1 * 11/2017 Sun ........................ H04J 11/004
9,900,125 B2 * 2/2018 Murakami ........... H04B 7/0413
9,906,397 B2 * 2/2018 Park ...................... H04L 27/362
9,917,721 B2 * 3/2018 Gerdes .................... H04L 27/00
9,967,127 B1 * 5/2018 Sun ..................... H04L 27/3405
10,033,567 B2 * 7/2018 Stadelmeier ............ H04L 27/38
10,326,635 B2 * 6/2019 Loghin ............... H04L 27/0008
10,341,161 B2 * 7/2019 Gerdes .................... H04L 27/38
10,404,504 B2 * 9/2019 Yuan ....................... H04L 27/36
10,411,944 B2 * 9/2019 Murakami ............ H04L 27/362
10,461,974 B2 * 10/2019 Wu ..................... H04L 27/2042
10,547,487 B1 * 1/2020 Zhang ................. H04L 27/3411
10,601,629 B2 * 3/2020 Krishnan ............ H04L 27/0008
10,659,275 B2 * 5/2020 Stadelmeier .......... H03M 13/25
10,659,276 B2 * 5/2020 Murakami .......... H04L 27/0008
10,735,236 B1 * 8/2020 Huang ................ H04L 27/2618
10,790,929 B2 * 9/2020 Etezadi ................. H04L 1/0052
10,819,464 B2 * 10/2020 Murakami ............ H04L 1/0071
10,819,553 B2 * 10/2020 Wu .......................... H04B 7/08
10,979,276 B2 * 4/2021 Murakami ............ H04L 27/362
11,025,363 B2 * 6/2021 Murakami ............ H04L 1/0057
11,075,713 B2 * 7/2021 Arambepola ........... H04L 1/004
11,258,651 B2 * 2/2022 Murakami ............ H04L 27/389
11,463,290 B2 * 10/2022 Tolson ................ H04L 27/3818
11,483,075 B2 * 10/2022 Beacall ................ H04B 10/505
11,671,304 B2 * 6/2023 Murakami .............. H04L 27/04 375/261
11,736,320 B2 * 8/2023 Newman ................. H04L 25/06 375/262
11,902,079 B2 * 2/2024 Torbatian ........... H04B 10/5161
11,929,865 B2 * 3/2024 Sasaki ................... H04L 27/362
12,034,571 B2 * 7/2024 Newman ........... H04L 25/03006
12,068,903 B2 * 8/2024 Murakami .......... H04L 27/3488
12,267,112 B2 * 4/2025 Koga .................. H04L 27/3405
12,294,479 B2 * 5/2025 Paz ..................... H04L 27/3483
12,335,086 B2 * 6/2025 Gilat ....................... H04L 27/34
12,457,145 B2 * 10/2025 Yang ................... H04L 27/3483
2001/0002202 A1 * 5/2001 Feher ...................... H04L 27/38 375/296
2004/0196923 A1 * 10/2004 Feher .................. H04L 27/0004 375/299
2004/0264592 A1 * 12/2004 Sibecas .................. H01Q 21/24 375/267
2005/0002465 A1 * 1/2005 Jeong ...................... H04L 27/38 375/261
2005/0058193 A1 * 3/2005 Saed ................. H04L 25/03159 375/232
2007/0030925 A1 * 2/2007 Shashidhar ............. H04L 27/38 375/340
2007/0047678 A1 * 3/2007 Sibecas .................. H04L 5/023 375/350
2007/0070877 A1 * 3/2007 Sun ..................... H04L 27/0012 370/208
2007/0110127 A1 * 5/2007 Mergen ............... H04L 25/0216 375/350
2008/0025323 A1 * 1/2008 Khan .................. H04L 27/3488 370/400
2008/0170636 A1 * 7/2008 Han .................... H04L 27/2615 375/261
2008/0219362 A1 * 9/2008 Feher .................... H04L 1/0056 455/501

(56) References Cited

U.S. PATENT DOCUMENTS

2008/0267316 A1* 10/2008 Golitschek Edler Von Elbwart .................. H04L 27/34 375/295
2009/0323858 A1* 12/2009 Seller .................. H04L 27/3405 375/295
2011/0206164 A1* 8/2011 Golitschek Edler Von Elbwart .................. H04L 27/34 375/320
2011/0274194 A1* 11/2011 Feher ...................... H04L 27/34 375/261
2012/0051415 A1* 3/2012 Huang .................... H04L 27/38 375/230
2012/0071104 A1* 3/2012 Onodera ............... H04L 1/0035 455/296
2012/0243634 A1* 9/2012 Seller ................ H04L 27/26524 375/295
2014/0269959 A1* 9/2014 Lim ........................ H04L 27/38 375/261
2015/0003545 A1* 1/2015 Lopez ................. H04L 27/2089 375/261
2015/0117866 A1* 4/2015 Chien ..................... H04L 27/38 398/140
2015/0365129 A1* 12/2015 Murakami ............. H04B 1/711 375/142
2016/0020930 A1 1/2016 Kolze et al.
2016/0197752 A1* 7/2016 Schmalen ........... H04L 27/3455 375/298
2017/0118062 A1* 4/2017 Loghin ................... H04L 27/36
2018/0262381 A1* 9/2018 Wu ......................... H04L 27/34
2019/0020529 A1* 1/2019 Lei ....................... H04L 27/3488
2019/0132171 A1* 5/2019 Limberg ............. H04L 27/2067
2019/0149389 A1* 5/2019 Torbatian ............. H04B 10/541 375/298
2020/0344105 A1* 10/2020 Stadelmeier ............ H04L 1/007
2021/0091858 A1* 3/2021 Bonetti .............. H04B 10/5161
2021/0288847 A1* 9/2021 Dong .................. H04L 27/0012
2021/0320835 A1* 10/2021 Huang .................. H04L 1/0047
2021/0328852 A1* 10/2021 Shimanouchi .......... H04L 27/36
2023/0318901 A1* 10/2023 Tao ....................... H03M 13/25 375/261
2023/0353282 A1* 11/2023 Tao ....................... H04L 1/0058
2025/0030581 A1* 1/2025 Yuan ..................... H04L 1/0058
2025/0202742 A1* 6/2025 Memisoglu ............. H04L 27/04
2025/0310172 A1* 10/2025 Yang ................... H04L 27/3477
2025/0310173 A1* 10/2025 Shimanouchi .......... H04L 27/36

FOREIGN PATENT DOCUMENTS

CN 1387717 A * 12/2002 ........... H03L 7/1976
CN 1190931 C * 2/2005 ......... H04L 27/2017
CN 1299439 C * 2/2007 ............... H04L 1/04
CN 1926783 A * 3/2007 ......... H04L 27/2602
CN 1965543 A * 5/2007 ............... H04L 9/40
CN 1977507 A * 6/2007 ........... H03C 3/0933
CN 100583861 C * 1/2010 ........... H03C 3/0925
CN 102217399 A * 10/2011 ......... H04L 27/0014
CN 102694709 A * 9/2012
CN 103618687 A * 3/2014
CN 102217399 B * 5/2014 ......... H04L 27/0014
CN 102694709 B * 6/2014
CN 104333436 A * 2/2015 ........... H04L 1/0656
CN 104468455 A * 3/2015 ......... H04L 27/2614
CN 105553610 A * 5/2016 ............. H04L 1/006
CN 103618687 B * 3/2017
CN 107231193 A * 10/2017 .......... H04L 27/3411
CN 104468455 B * 9/2018 ......... H04L 27/2614
CN 109639617 A * 4/2019 ......... H04L 27/2614
CN 109672642 A * 4/2019 ............. H04L 27/34
CN 110603794 A * 12/2019 ........ H04W 52/0235
CN 110754124 A 2/2020
CN 107231193 B * 4/2020 ......... H04B 10/5162
CN 106850013 B * 8/2020 ........... H04B 7/0413
CN 114679361 A * 6/2022 ......... H04L 27/2614
CN 115987745 A * 4/2023
CN 114679361 B * 11/2023 ......... H04L 27/2614
CN 118101007 A * 5/2024 ........... H04L 1/0612
CN 118101007 B * 8/2024 ........... H04L 1/0612
DE 102008028750 A1 * 12/2008 ........... H04L 27/361
DE 60225605 T2 * 4/2009 ............. H04L 27/34
DE 102008028750 B4 * 6/2016 ........... H03C 3/0975
EP 0565652 B1 * 11/1998 ........... H04L 27/262
EP 2154856 A1 * 2/2010 ......... H04L 27/3488
EP 1665698 B1 * 3/2011 ............. H04L 27/01
EP 2840750 A1 * 2/2015 ......... H04L 27/3483
EP 1958408 B1 * 11/2019 ......... H04L 27/2621
EP 2840750 B1 * 5/2020 ......... H04L 27/2085
EP 4199397 A1 * 6/2023 ............ H03M 13/27
EP 4199398 A1 * 6/2023 ........... H04L 1/0045
ES 2188373 B1 * 10/2004 ........... H04L 1/0009
ES 2300470 T3 * 6/2008 ............. H04L 27/34
ES 2937712 A1 * 3/2023 ........... H04B 7/0452
ES 2937712 B2 * 10/2023 ........... H04B 7/0452
GB 2354649 A * 3/2001 ............. H03C 3/095
JP 2001127810 A * 5/2001 ......... H04L 27/0012
KR 20080067741 A * 7/2008 ............. H04L 27/36
KR 20080068751 A * 7/2008 ............ H04W 28/02
TW 507459 B * 10/2002 ............. H04L 49/90
TW 529311 B * 4/2003 ............. H04L 49/90
WO WO-9309619 A1 * 5/1993 ........... H04L 27/262
WO WO-02095978 A1 * 11/2002 ............. H04L 27/26
WO WO-2004006528 A1 * 1/2004 ......... H04L 27/0008
WO WO-2005025074 A2 * 3/2005 ......... H04L 27/2602
WO WO-2005027384 A1 * 3/2005 ............. H04B 7/005
WO WO-2005067241 A1 * 7/2005 ............. H04L 27/38
WO WO-2005119985 A1 * 12/2005 ............... H04L 9/40
WO WO-2006070438 A1 * 7/2006 ............. H04L 27/38
WO WO-2006118056 A1 * 11/2006 ........... H03C 3/0925
WO WO-2007000180 A1 * 1/2007 ............. H04L 27/34
WO WO-2007027301 A2 * 3/2007 ............. H04L 5/023
WO WO-2007056755 A2 * 5/2007 ......... H04L 25/0204
WO WO-2007066973 A2 * 6/2007 ......... H04L 27/3488
WO WO-2007121174 A1 * 10/2007 ........... H04L 25/022
WO WO-2009005216 A1 * 1/2009 ......... H04L 27/3483
WO WO-2009094913 A1 * 8/2009 ......... H04L 27/3483
WO WO-2009119736 A1 * 10/2009 ......... H04L 27/3488
WO WO-2009124088 A1 * 10/2009 ......... H04L 27/0008
WO WO-2010017638 A1 * 2/2010 ......... H04L 27/3488
WO WO-2011094001 A1 * 8/2011 ......... H04L 27/2649
WO WO-2013003851 A1 * 1/2013 ......... H04L 27/3461
WO WO-2014055637 A1 * 4/2014 ........... H04B 10/516
WO WO-2014142598 A1 * 9/2014 ......... H04L 27/3405
WO WO-2015024856 A1 * 2/2015 ......... H04L 27/3455
WO WO-2015058385 A1 * 4/2015 ......... H04L 27/0012
WO WO-2016099157 A1 * 6/2016 ............. H04L 27/34
WO WO-2017019131 A1 * 2/2017 ........... H04L 7/0041
WO WO-2017080392 A1 * 5/2017 ............... H04B 7/12
WO WO-2017196425 A1 * 11/2017 ............. H04L 27/20
WO WO-2018030205 A1 * 2/2018 ........... H04L 1/0055
WO WO-2019014203 A1 * 1/2019 .............. H04J 14/06
WO WO-2019070358 A1 * 4/2019 ........... H04L 27/364
WO WO-2019125226 A1 * 6/2019 ............. H04L 27/38
WO WO-2020095013 A1 * 5/2020 ........... H04L 27/183
WO WO-2020107039 A2 * 5/2020 ............... H04L 1/20
WO WO-2020135458 A1 * 7/2020 ......... H04L 27/3405
WO WO-2020210845 A2 * 10/2020
WO WO-2021243436 A1 * 12/2021 ............. H04L 27/38
WO WO-2022038859 A1 * 2/2022 ................ H04J 3/00
WO WO-2022114588 A1 * 6/2022 ......... H04L 27/3854
WO WO-2022206903 A1 * 10/2022 ............. H04L 27/20
WO WO-2023287580 A1 * 1/2023 .......... H04J 13/0077
WO WO-2023052667 A1 * 4/2023 ........... H04B 7/0452
WO WO-2023104310 A1 * 6/2023 .......... H04L 27/3411
WO WO-2024059455 A1 * 3/2024 ........... H04L 1/0003
WO WO-2024113975 A1 * 6/2024 ............. H04L 27/36
WO WO-2025153188 A1 * 7/2025 ......... H04L 27/2697

OTHER PUBLICATIONS

H. Jin, K. Peng and J. Song, “Backward Compatible Multiservice Transmission Over the DTMB System,” in IEEE Transactions on Broadcasting, vol. 60, No. 3, pp. 499-510, Sep. 2014, (Year: 2014).*

(56) References Cited

OTHER PUBLICATIONS

H. Jin, K. Peng, J. Song and T. Cheng, "Augmented data transmission for DTMB system," 2013 IEEE International Symposium on Broadband Multimedia Systems and Broadcasting (BMSB), London, UK, 2013, pp. 1-5, (Year: 2013).*

A. Annamalai, J. Lu and D. R. Vaman, "A Receiver-Oriented Rate-Adaptation Strategy for Improving Network Efficiency in Mobile Ad-Hoc Networks," 2008 IEEE Sarnoff Symposium, Princeton, NJ, USA, 2008, pp. 1-5, (Year: 2008).*

A. Mohammadian and C. Tellambura, "RF Impairments in Wireless Transceivers: Phase Noise, CFO, and IQ Imbalance—A Survey, " in IEEE Access, vol. 9, pp. 111718-111791, 2021, (Year: 2021).*

A. K. S. Al-bayati and O. M. Aloquili, "Constellation-switching precoding for blind detection of co-channel signals: application to 8-ary signaling," in IEEE Transactions on Communications, vol. 57, No. 10, pp. 2891-2894, Oct. 2009, doi: 10.1109/TCOMM.2009. (Year: 2009).*

International Search Report and Written Opinion—PCT/US2025/042254—ISA/EPO—Dec. 11, 2025.

* cited by examiner

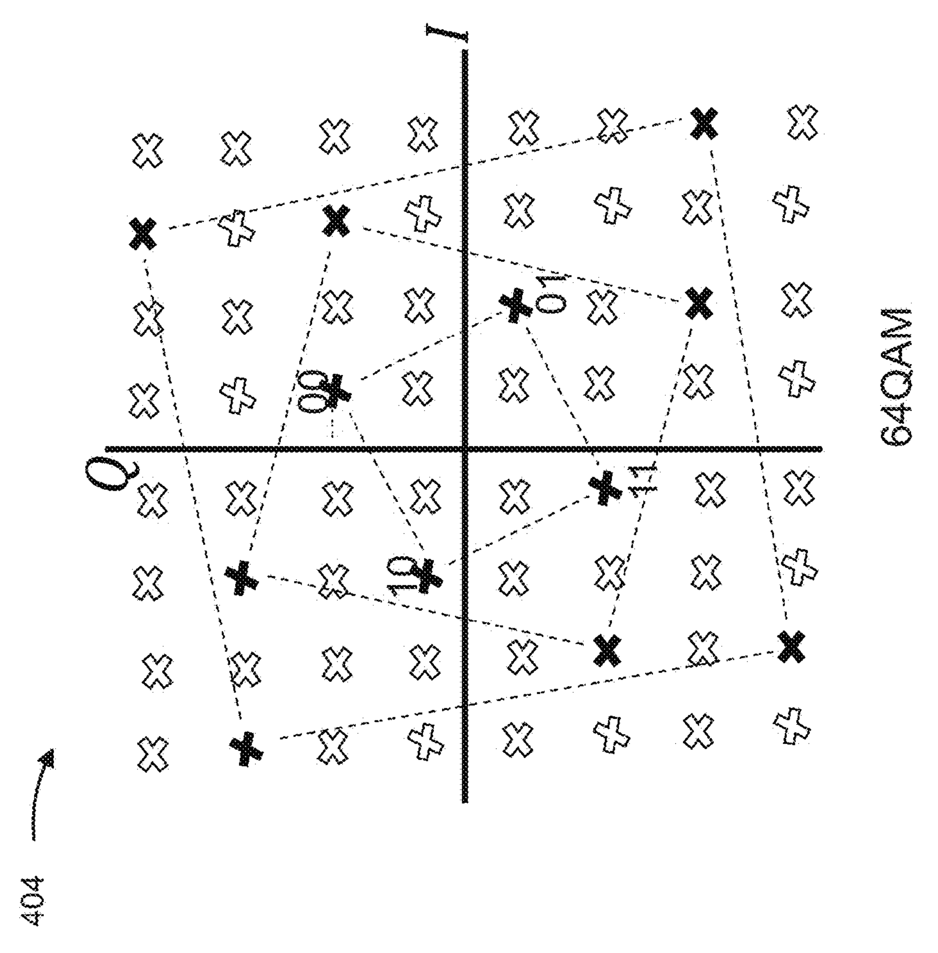
FIG. 4
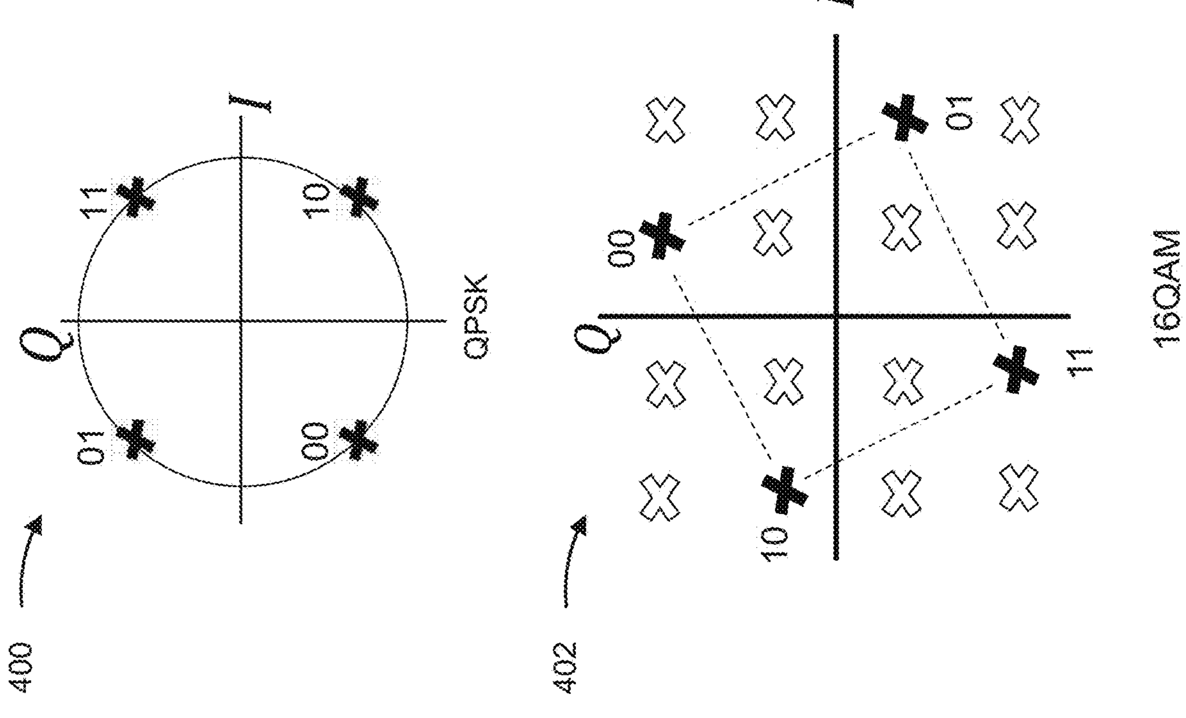

500

525
Modulate first set of bits into first modulation symbol, selected from first set of modulation points 530
Modulate second set of bits into second modulation symbol, selected from second set of modulation points (first set of modulation points subset of second set of modulation points)

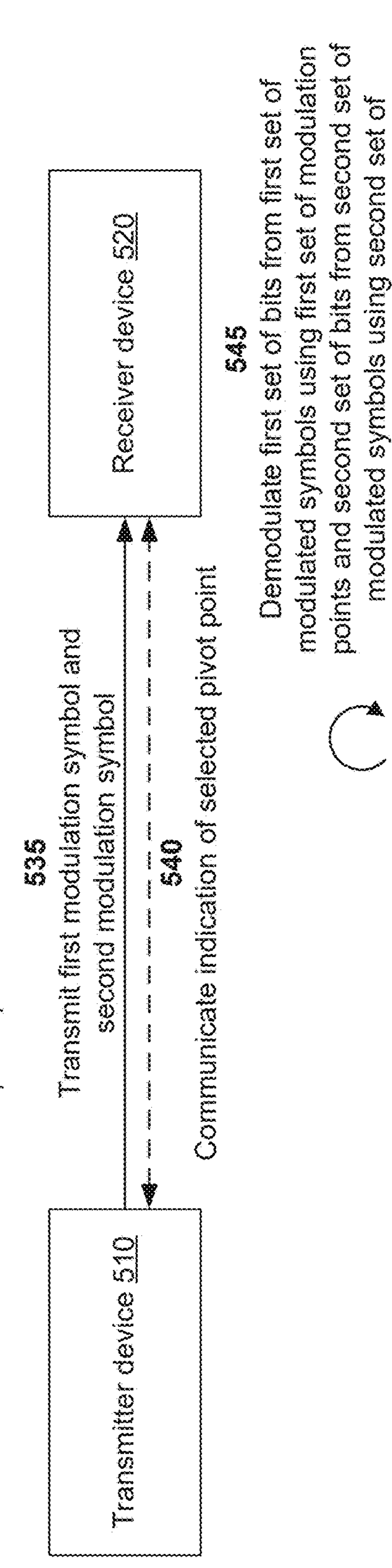

545
Demodulate first set of bits from first set of modulated symbols using first set of modulation points and second set of bits from second set of modulated symbols using second set of modulation points (first set of bits being a subset of second set of bits)

550
Combine first set of bits and second set of bits

EMBEDDED CONSTELLATION

FIELD OF THE DISCLOSURE

Aspects of the present disclosure generally relate to wireless communication and specifically relate to techniques, apparatuses, and methods for an embedded modulation constellation.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 4 is a diagram illustrating examples of constellations, in accordance with the present disclosure.

FIGS. 5A-5C are diagrams illustrating examples of embedded constellations, in accordance with the present disclosure.

SUMMARY

Figure 1:
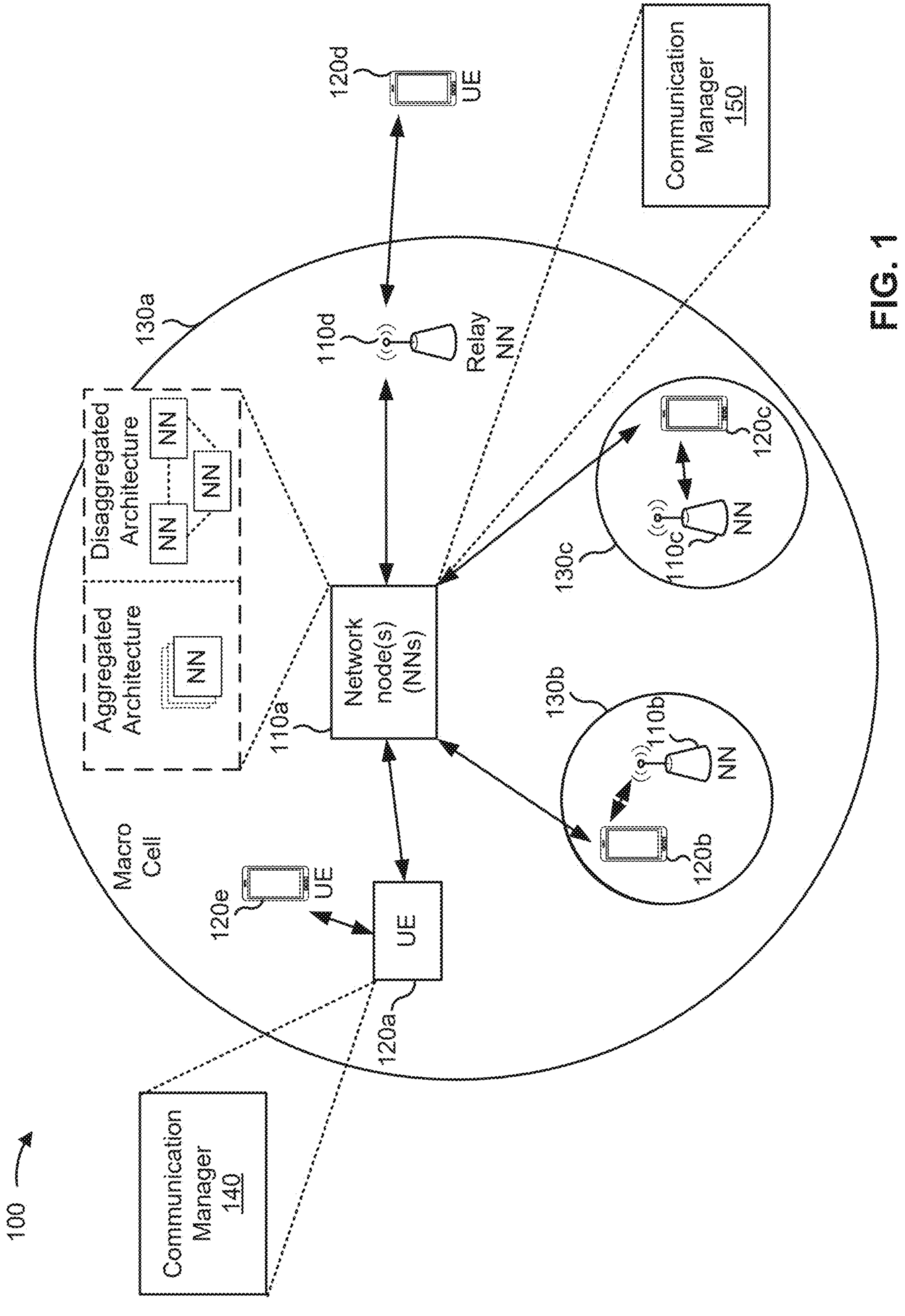
FIG. 1 is a diagram illustrating an example of a wireless communication network, in accordance with the present disclosure.

Some aspects described herein relate to a method of wireless communication performed by a transmitter device. The method may include modulating a first set of bits into a first modulation symbol, selected from a first set of modulation points. The method may include modulating a second set of bits into a second modulation symbol, selected from a second set of modulation points, the first set of modulation points being a subset of the second set of modulation points. The method may include transmitting the first modulation symbol and the second modulation symbol to a receiver device.

Some aspects described herein relate to a method of wireless communication performed by a receiver device. The method may include receiving a first set of modulated symbols and a second set of modulated symbols. The method may include demodulating a first set of bits from the first set of modulated symbols using the first set of modulation points and the second set of bits from the second set of modulated symbols using the second set of modulation points, the first set of bits being a subset of the second set of bits. The method may include combining the first set of bits and the second set of bits.

Some aspects described herein relate to an apparatus for wireless communication at a transmitter device. The apparatus may include one or more memories and one or more processors coupled to the one or more memories. The one or more processors may be individually or collectively configured to modulate a first set of bits into a first modulation symbol, selected from a first set of modulation points. The one or more processors may be individually or collectively configured to modulate a second set of bits into a second modulation symbol, selected from a second set of modulation points, the first set of modulation points being a subset of the second set of modulation points. The one or more processors may be individually or collectively configured to transmit the first modulation symbol and the second modulation symbol to a receiver device.

Some aspects described herein relate to an apparatus for wireless communication at a receiver device. The apparatus may include one or more memories and one or more processors coupled to the one or more memories. The one or more processors may be configured to receive a first set of modulated symbols and a second set of modulated symbols. The one or more processors may be configured to demodulate a first set of bits from the first set of modulated symbols using the first set of modulation points and the second set of bits from the second set of modulated symbols using the second set of modulation points, the first set of bits being a subset of the second set of bits. The one or more processors may be configured to combine the first set of bits and the second set of bits.

Some aspects described herein relate to a non-transitory computer-readable medium that stores a set of instructions for wireless communication by a transmitter device. The set of instructions, when executed by one or more processors of the transmitter device, may cause the transmitter device to modulate a first set of bits into a first modulation symbol, selected from a first set of modulation points. The set of instructions, when executed by one or more processors of the transmitter device, may cause the transmitter device to modulate a second set of bits into a second modulation symbol, selected from a second set of modulation points, the first set of modulation points being a subset of the second set of modulation points. The set of instructions, when executed by one or more processors of the transmitter device, may cause the transmitter device to transmit the first modulation symbol and the second modulation symbol to a receiver device.

Some aspects described herein relate to a non-transitory computer-readable medium that stores a set of instructions for wireless communication by a receiver device. The set of instructions, when executed by one or more processors of the receiver device, may cause the receiver device to receive a first set of modulated symbols and a second set of modulated symbols. The set of instructions, when executed by one or more processors of the receiver device, may cause the receiver device to demodulate a first set of bits from the first set of modulated symbols using the first set of modulation points and the second set of bits from the second set of modulated symbols using the second set of modulation points, the first set of bits being a subset of the second set of bits. The set of instructions, when executed by one or more processors of the receiver device, may cause the receiver device to combine the first set of bits and the second set of bits.

Some aspects described herein relate to an apparatus for wireless communication. The apparatus may include means for modulating a first set of bits into a first modulation symbol, selected from a first set of modulation points. The apparatus may include means for modulating a second set of bits into a second modulation symbol, selected from a second set of modulation points, the first set of modulation points being a subset of the second set of modulation points. The apparatus may include means for transmitting the first modulation symbol and the second modulation symbol to a receiver device.

Some aspects described herein relate to an apparatus for wireless communication. The apparatus may include means for receiving a first set of modulated symbols and a second set of modulated symbols. The apparatus may include means for demodulating a first set of bits from the first set of modulated symbols using the first set of modulation points and the second set of bits from the second set of modulated symbols using the second set of modulation points, the first set of bits being a subset of the second set of bits. The apparatus may include means for combining the first set of bits and the second set of bits.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

DETAILED DESCRIPTION

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A transmitter device may use a modulation and coding scheme (MCS) to encode data for transmission. An MCS, or a modulation of the MCS, may involve a constellation, which is an arrangement of signal points (modulation points) on a complex plane. Each modulation point represents information as a combination of data bits. A specific modulation point may be mapped to a modulation symbol, which is the actual data value or signal. That is, each modulation symbol is encoded as one of the modulation points of the constellation. The transmitter device may transmit the modulation symbol to convey the specific information.

An example of an MCS is Quadrature Phase Shift Keying (QPSK), where the phase of the carrier signal is varied to represent data. QPSK uses four distinct phase shifts (0°, 90°, 180°, and) 270° for four modulation points evenly spaced on a circle centered at the origin of a complex plane. Each modulation point represents a different pair of bits. A 16 Quadrature Amplitude Modulation (16-QAM) combines both amplitude and phase modulation. There are 16 different modulation points in the constellation, each modulation point representing a unique combination of 4 bits of data.

A transmitter device may transmit downlink control information (DCI) that is multiplexed (or piggybacked) with data on a physical downlink shared channel (PDSCH), transmit uplink control information (UCI) that is multiplexed with data on a physical uplink shared channel (PUSCH), or transmit sidelink control information (SCI) on a physical sidelink shared channel (PSSCH). This may be more generally described as piggybacking xCI on a data channel PxSCH. UCI uses the same modulation order as the data when UCI is piggybacked on the PUSCH. On the other hand, SCI-2 uses QPSK when piggybacked on the PSSCH. However, there are inefficiencies with these approaches, because the modulation orders for each type of information may waste signaling resources or reduce throughput.

Various aspects relate generally to modulation. Some aspects more specifically relate to a transmitter that may multiplex (piggyback) xCI on a PxSCH, where the xCI uses a first constellation (e.g., QPSK), and the first constellation is embedded in a larger M-ary QAM (M-QAM) second constellation (e.g., 16-QAM, 64-QAM, 256-QAM, 1024-QAM). For example, if any point (pivot point) inside a higher order QAM is selected and rotated by 90°, the rotation may arrive at another point in the same QAM constellation. By rotating a selected pivot point by 0°, 90°, 180°, and 270°, the resulting 4 points (pivot point and remaining points) are a subset of the points in the M-QAM constellation. In some aspects, an M-QAM constellation may be embedded in an M-squared QAM constellation, where the M of the larger constellation is a square value of the M of the smaller constellation.

The transmitter device may link a first set of modulation points with a first modulated symbol and link a second set of modulation points with a second modulation symbol. The first set of modulation points may include a pivot point and remaining points that are with a second set of modulation points that also include a pivot point and remaining points. The transmitter device may modulate the first set of bits into the first modulation symbol, where the first modulation symbol (or corresponding modulation point) is selected from the first set of modulation points. The transmitter device may modulate the second set of bits into the second modulation symbol. The second modulation symbol (or corresponding modulation point) may be selected from the second set of modulation points, where the first set of modulation points are a subset of the second set of modulation points. The transmitter device may transmit the first modulation symbol and the second modulation symbol to a receiver device.

A receiver device may receive the modulated symbols. The receiver device may demodulate the first set of bits from the first modulated symbol using the first set of modulation points and the second set of bits from the second modulated symbol using the second set of modulation points. The receiver device may combine the first set of bits and the second set of bits.

Particular aspects of the subject matter described in this disclosure can be implemented to realize one or more of the following potential advantages. By using an embedded constellation (first set of modulation points within the second set of modulation points), it is possible to obtain a first constellation as a subset of a higher order constellation. Furthermore, the transmitter device may have flexibility to use the same modulator to modulate the xCI and PxSCH or separately demodulate the xCI and PxSCH, hence enjoying the benefit of using a lower modulation order for xCI. As a result, throughput is increased, latency is reduced, and/or signaling resources are conserved.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (cMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) user equipment (UE) functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*c*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FRI is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FRI, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (IFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit DCI (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more PDSCHs. Uplink channels may similarly include one or more control channels and one or more data channels. An uplink control channel may be used to transmit UCI (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node **110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120** that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, cMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*c* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NCJT).

In some aspects, a transmitter device (e.g., a UE 120, a network node 110) may include a communication manager 140 or 150. As described in more detail elsewhere herein, the communication manager 140 or 150 may modulate a first set of bits into a first modulation symbol, selected from a first set of modulation points. The communication manager 140 or 150 may modulate a second set of bits into a second modulation symbol, selected from a second set of modulation points, the first set of modulation points being a subset of the second set of modulation points. The communication manager 140 or 150 may transmit the first modulation symbol and the second modulation symbol to a receiver device. Additionally, or alternatively, the communication manager 140 or 150 may perform one or more other operations described herein.

In some aspects, a receiver device (e.g., a UE 120, a network node 110) may include a communication manager 140 or 150. As described in more detail elsewhere herein, the communication manager 140 or 150 may receive a first set of modulated symbols and a second set of modulated symbols. The communication manager 140 or 150 may demodulate a first set of bits from the first set of modulated symbols using the first set of modulation points and the second set of bits from the second set of modulated symbols using the second set of modulation points, the first set of bits being a subset of the second set of bits. The communication manager 140 or 150 may combine the first set of bits and the second set of bits. Additionally, or alternatively, the communication manager 140 or 150 may perform one or more other operations described herein.

As indicated above, FIG. 1 is provided as an example. Other examples may differ from what is described with regard to FIG. 1.

Figure 2:
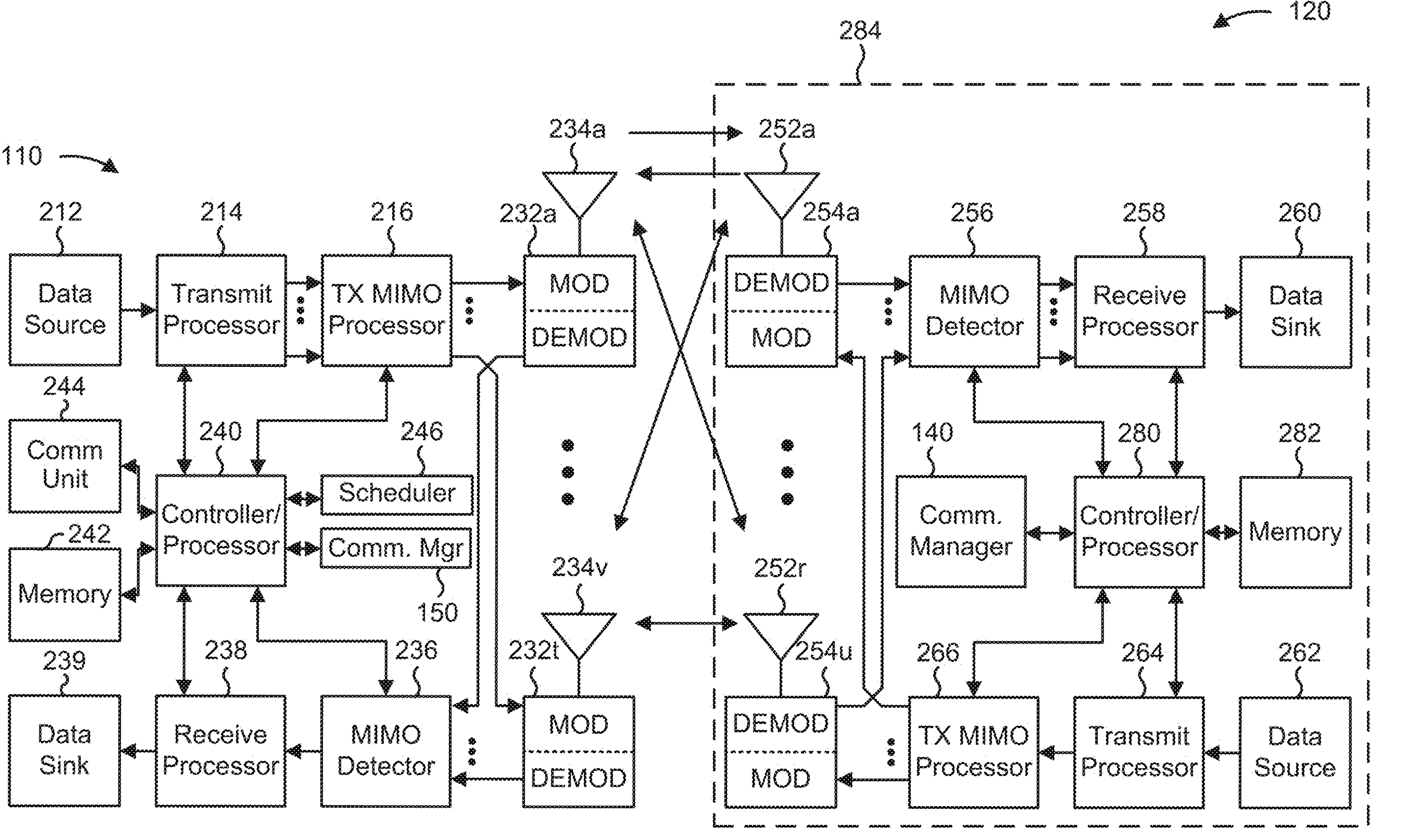
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, “antenna” can refer to one or more antennas, one or more antenna panels, one or more antenna groups, one or more sets of antenna elements, or one or more antenna arrays. “Antenna panel” can refer to a group of antennas (such as antenna elements) arranged in an array or panel, which may facilitate beamforming by manipulating parameters of the group of antennas. “Antenna module” may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term “beam” may refer to a directional transmission of a wireless signal toward a receiving device or otherwise in a desired direction. “Beam” may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
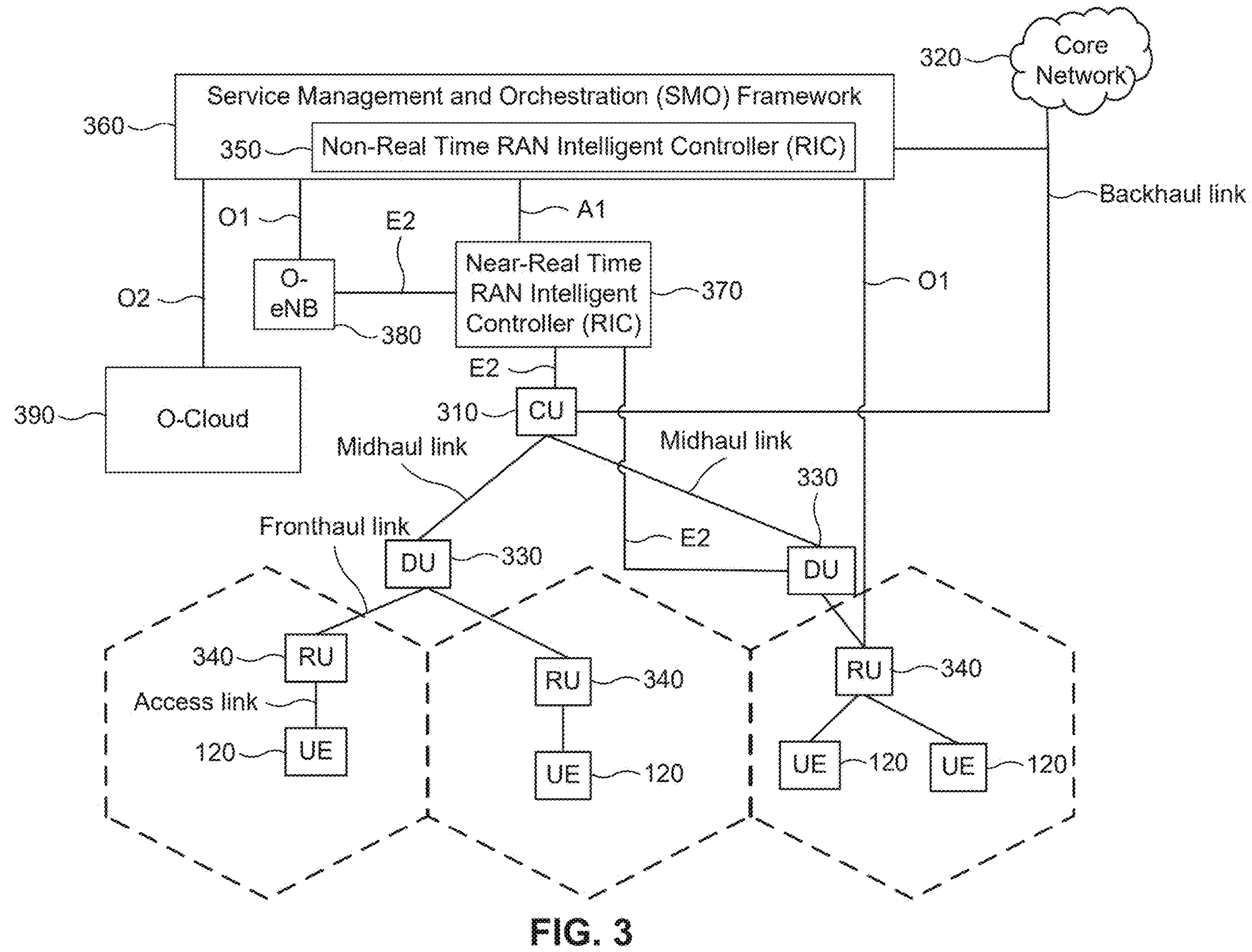
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

A network entity (e.g., a network node 110), the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with an embedded modulation constellation, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, process 900 of FIG. 9, or other processes as described herein (alone or in conjunction with one or more other processors). In some aspects, the transmitter device or the receiver device described herein is the UE 120, is included in the UE 120, or includes one or more components of the UE 120 shown in FIG. 2. In some aspects, the transmitter device or the receiver device described herein is the network node 110, is included in the network node 110, or includes one or more components of the network node 110 shown in FIG. 2. The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, a transmitter device (e.g., a UE 120, a network node 110) includes means for modulating a first set of bits into a first modulation symbol, selected from a first set of modulation points; means for modulating a second set of bits into a second modulation symbol, selected from a second set of modulation points, the first set of modulation points being a subset of the second set of modulation points; and/or means for transmitting the first modulation symbol and the second modulation symbol to a receiver device. In some aspects, the means for the transmitter device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the transmitter device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a receiver device (e.g., a UE 120, a network node 110) includes means for receiving a first set of modulated symbols and a second set of modulated symbols; means for demodulating a first set of bits from the first set of modulated symbols using the first set of modulation points and the second set of bits from the second set of modulated symbols using the second set of modulation points, the first set of bits being a subset of the second set of bits; and/or means for combining the first set of bits and the second set of bits. In some aspects, the means for the receiver device to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In some aspects, the means for the receiver device to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 3 is provided as an example. Other examples may differ from what is described with regard to FIG. 3.

FIG. 4 is a diagram illustrating examples of constellations, in accordance with the present disclosure.

A transmitter device may use an MCS to encode data for transmission. An MCS, or a modulation of the MCS, may involve a constellation, which is an arrangement of signal points (modulation points) on a complex plane. Each modulation point represents information as a combination of data bits. A specific modulation point may be mapped to a modulation symbol, which is the actual data value or signal. That is, each modulation symbol is encoded as one of the modulation points of the constellation. The transmitter device may transmit the modulation symbol to convey the specific information.

An example of a modulation scheme is QPSK, where the phase of the carrier signal is varied to represent data. QPSK uses four distinct phase shifts (e.g., 0°, 90°, 180°, and 270°) for four modulation points evenly spaced on a circle centered at the origin of a complex plane, as shown by example 400. Each modulation point represents a different pair of bits. As each phase shift encodes two bits of data, the QPSK can transmit 2 bits per modulation symbol. In a QPSK system, the modulation symbol may be a binary value (e.g., "10") that is mapped to one of the specific phase shifts represented by the modulation points on the constellation diagram. QPSK offers a balance between data rate and error performance, especially in scenarios with lower signal-to-noise ratios (SNRs).

Example 402 shows 16-QAM, which combines both amplitude and phase modulation. There are 16 different modulation points in the constellation, each modulation point representing a unique combination of 4 bits of data. The 16 modulation points are arranged in a 4×4 grid on the complex plane, where the horizontal axis represents one amplitude dimension and the vertical axis represents another. 16-QAM is used in scenarios where higher data rates are required and the signal quality is relatively high. The dark "+" symbols labeled as 00, 01, 10, and 11 represent modulation points selected for sending two bits. The 16-QAM may also be used to transmit four bits, as shown later in FIG. 5B.

64-QAM is an extension of 16-QAM, using 64 distinct modulation points to encode data. Each symbol in 64-QAM encodes six bits of data. Example 404 shows that the 64-QAM constellation is a more densely packed grid compared to 16-QAM, with the 64 points arranged in an 8×8 matrix on the complex plane. 64-QAM is used in high-data-rate scenarios, where the SNR is high enough to support the increased complexity and potential for error. The dark "+" symbols represent possible sets of modulation points (each connected by dotted lines). The dark "+" symbols labeled as 00, 01, 10, and 11 represent a first set of modulation points that is selected for sending two bits. The first set of modulation points fits within a second set of modulation points. The second set of modulation points has a greater power level than the first set of modulation points. A third set of modulation points (outer set) may have an even greater power level.

These MCSs, among others (e.g., 256-QAM), may be selected based on trade-offs between data rate and signal robustness. QPSK is more robust but lower in data rate, while higher-order schemes like 16-QAM and 64-QAM offer higher data rates but require better signal quality to maintain performance.

A transmitter device may transmit DCI that is multiplexed (or piggybacked) with data on a PDSCH, transmit UCI that is multiplexed with data on a PUSCH, or transmit SCI on a PSSCH. This may be more generally described as piggybacking xCI on a data channel PxSCH. In a 5G design, UCI uses the same modulation order as the data when UCI is piggybacked on the PUSCH. On the other hand, SCI-2 uses QPSK when piggybacked on the PSSCH. However, there are inefficiencies with these approaches, which may waste signaling resources or reduce throughput.

As indicated above, FIG. 4 is provided as an example. Other examples may differ from what is described with regard to FIG. 4.

Figure 5B:
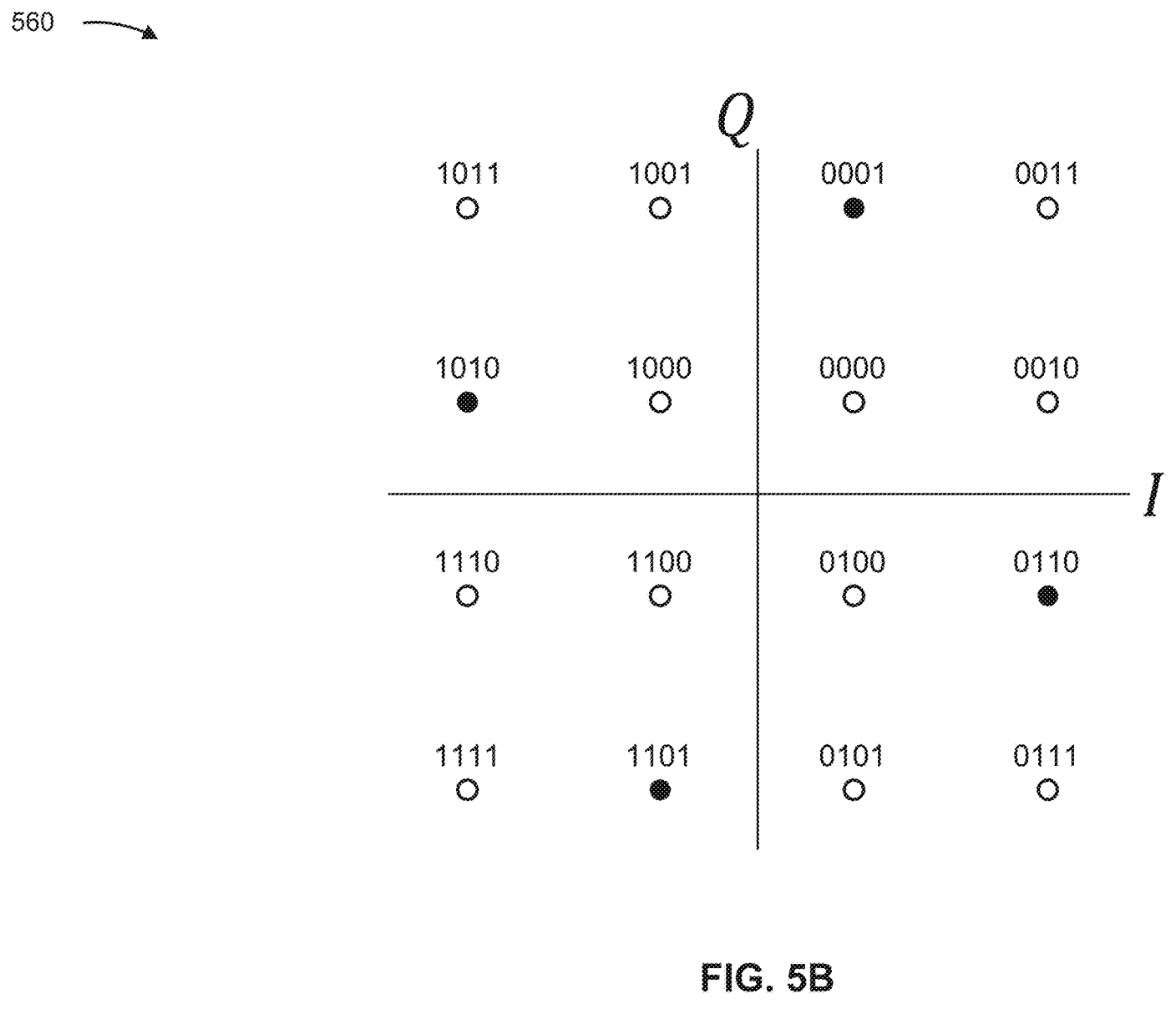
Figure 5C:
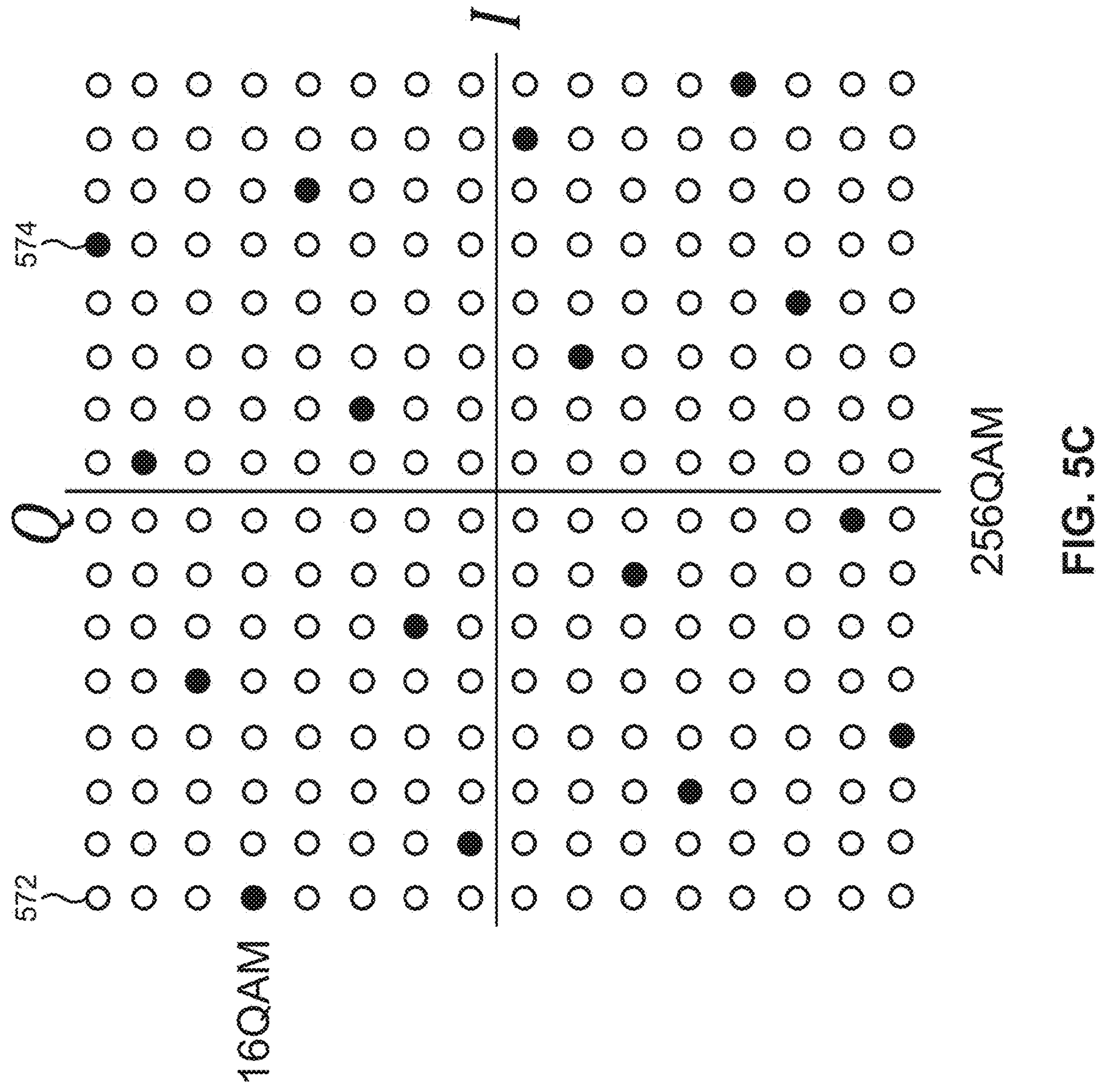

FIGS. 5A-5C are diagrams illustrating examples of embedded constellations, in accordance with the present disclosure. FIG. 5A shows a transmitter device 510 (e.g., UE 120, network node 110) that may communicate with a receiver device 520 (e.g., UE 120, network node 110) using a wireless network (e.g., wireless communication network 100).

According to various aspects described herein, a transmitter device (e.g., transmitter device 510) may multiplex (piggyback) xCI on a PxSCH, where the xCI uses a first constellation (e.g., QPSK), and the first constellation is embedded in a larger M-QAM second constellation (e.g., 16-QAM, 64-QAM, 256-QAM, 1024-QAM). For example, if any point (pivot point) inside a higher order QAM is selected and rotated by 90°, the rotation may arrive at another point in the same QAM constellation (due to rotational symmetry of the lattice). By rotating a selected pivot point by 0°, 90°, 180°, and 270°, the resulting 4 points (pivot point and remaining points) are a subset of the points in the M-QAM constellation.

The transmitter device 510 may link a first set of modulation points with a first modulated symbol and link a second set of modulation points with a second modulation symbol. The first set of modulation points may include a pivot point and remaining points that are with a second set of modulation points that includes the pivot point and the remaining points. As shown by reference number 525 in FIG. 5A, the transmitter device 510 may modulate the first set of bits into the first modulation symbol, where the first modulation symbol (or corresponding modulation point) is selected from the first set of modulation points. In some aspects, the first set of bits may correspond to control information (e.g., UCI, DCI, SCI), and a second set of bits may correspond to a physical shared channel transmission (e.g., PUSCH, PDSCH, PSSCH). The transmitter device 510 may multiplex the control information and the physical shared channel transmission such that the control information and the physical shared channel transmission undergo a same modulation. As shown by reference number 530, the transmitter device 510 may modulate the second set of bits into the second modulation symbol. The second modulation symbol (or corresponding modulation point) may be selected from the second set of modulation points, where the first set of modulation points are a subset of the second set of modulation points. As shown by reference number 535, the transmitter device 510 may transmit the first modulation symbol and the second modulation symbol to a receiver device. In some aspects, as shown by reference number 540, the transmitter device 510 may communicate (transmit or receive) an indication of the selected pivot point for the first set of modulation points. The indication may also indicate the selected pivot point for the second set of modulation points.

A receiver device (e.g., receiver device 520) may receive the modulated symbols. As shown by reference number 545, the receiver device 520 may demodulate the first set of bits from the first modulated symbol using the first set of modulation points and the second set of bits from the second modulated symbol using the second set of modulation points. As shown by reference number 550, the receiver device 520 may combine the first set of bits and the second set of bits. In some aspects, combining the first set of bits and the second set of bits may include generating a first log-likelihood ratio (LLR) associated with the first set of bits and a second LLR associated with the second set of bits using an M-QAM demodulator and combining the first LLR and the second LLR to obtain an LLR of a bit mapping to the QPSK constellation. Alternatively, in some aspects, the receiver device 520 may demodulate the first set of bits as QPSK symbols. The receiver device 520 may handle the xCI as QPSK, with a phase rotation and potential power scaling.

By using an embedded constellation (first set of modulation points within the second set of modulation points), it is possible to obtain a QPSK constellation as a subset of a higher order QAM. Furthermore, the transmitter device 510 may use the same modulator to modulate the xCI and PxSCH. There is no need to perform separate demodulation on the transmitter device 510. In an example of embedding a QPSK inside a 16-QAM constellation, if there are two bits for xCI, there are four possible modulation points "00", "01", "11", and "10" (as a notational convention). The modulation points may map to the pivot point, the 90° rotation point, the 180° rotation point, and the 270° rotation point. The same set of four points may also be viewed as points of a 16-QAM, where each point has a label comprising four bits instead of two bits. For example, the four points of the 16-QAM constellation may have labels "0001", "0110", "1101", and "1010", as shown by example 560 in FIG. 5B. Accordingly, a conversion procedure may include two operations. The first operation is to convert the QPSK labeling to the 16-QAM (four bit) labeling (e.g., according to the following: 00→0001, 01→0110, 11→1101, 10→1010.) Next, the four bits are modulated using conventional 16-QAM to arrive at one of the four points (associated with the first modulation scheme). While example 560 shows the conversion from the two bits labeling to the four bits labeling, other forms of conversion may be performed.

In some aspects, an M-QAM constellation may be embedded in an M-squared QAM constellation. For example, if M=16, a 16-QAM constellation may be embedded in an 256-QAM constellation, where the M of the larger constellation is a square value of the M of the smaller constellation. Example 570 in FIG. 5C shows constellation points of a 256-QAM constellation, shown by empty circles such as constellation point 572. Example 570 also shows constellation points of a 16-QAM constellation that is embedded in the 256-QAM constellation. These constellation points are shown by the solid circles such as constellation point 574.

In some aspects, the receiver device 520 may separately demodulate the xCI and PxSCH, hence enjoying the benefit of using a lower modulation order for xCI. In contrast with using the same modulation order between xCI and PxSCH, an embedded constellation may have a performance gain in MIMO fading channels, since it is much easier to jointly demodulate L QPSK symbols, rather than L 256QAM symbols in a non-linear MIMO demodulator. These aspects may be applicable to a more general case, where the first modulation is not QPSK, but another modulation. As a result, throughput is increased, latency is reduced, and/or signaling resources are conserved.

In some aspects, the pivot point and the remaining points may follow Gray mapping to optimize performance. Gray mapping may include assigning binary values to modulation points in such a way that adjacent points (or symbols) differ by only one bit. This is particularly useful for minimizing errors in data transmission.

As indicated above, FIGS. 5A-5C are provided as examples. Other examples may differ from what is described with regard to FIGS. 5A-5C.

Figure 6:
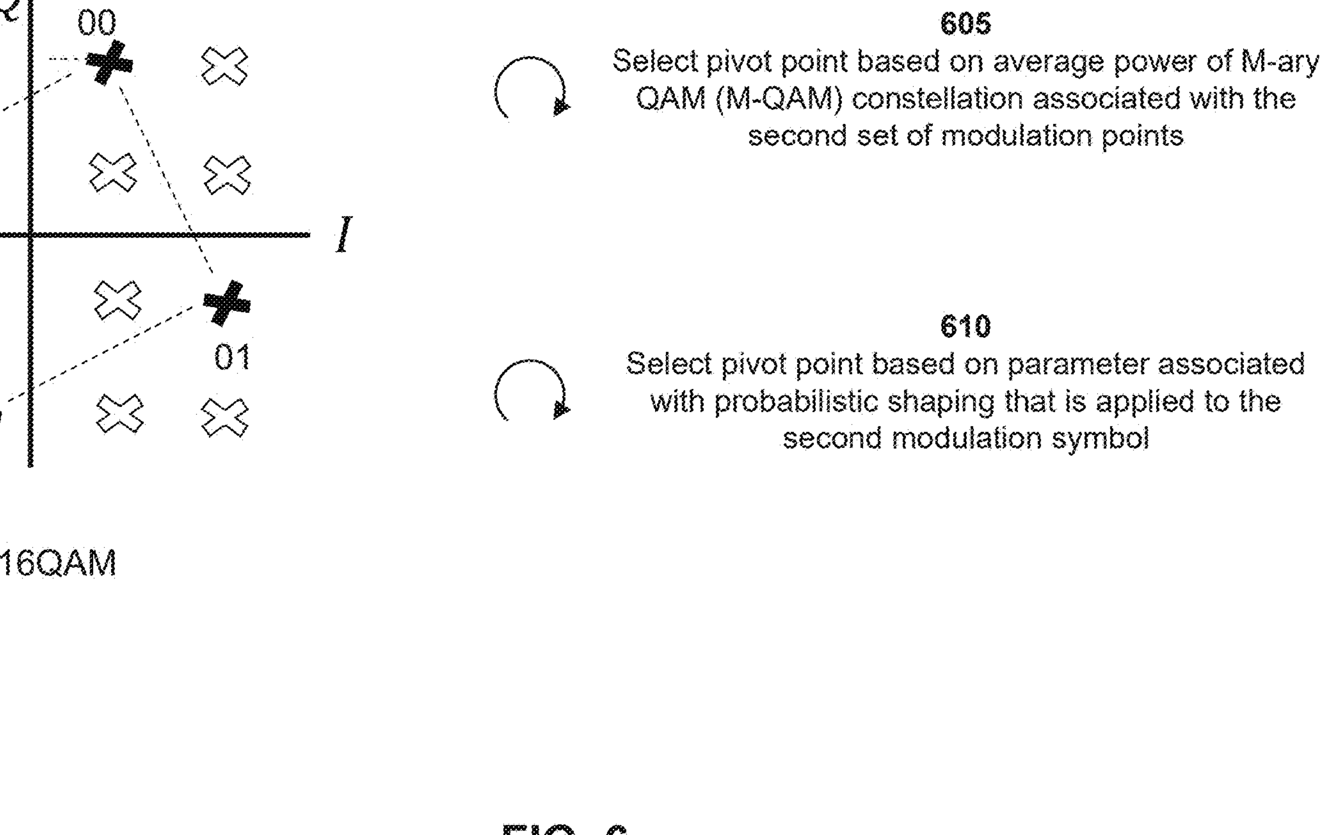
FIG. 6 is a diagram illustrating an example of selecting a pivot point, in accordance with the present disclosure.

FIG. 6 is a diagram illustrating an example 600 of selecting a pivot point, in accordance with the present disclosure.

In some aspects, the transmitter device 510 may select, as the pivot point, a point based at least in part on the average power of the M-QAM constellation, as shown by reference number 605. That is, the transmitter device 510 may select the pivot point whose power is close to the average power of the M-QAM constellation. The M-QAM constellation may be associated with a second set of modulation points, if the first set of modulation points are for QPSK and are inside the second set of modulation points. The M-QAM constellation may be associated with a first set of modulation points, if the first set of modulation points are inside a larger the second set of modulation points, such as for 64-QAM. For the 16-QAM of example 600, the first set of modulation points (shown as the solid points) may have a power that is equal to the average power of 16-QAM. 16-QAM has 3 power levels, 2/10 (20% of base power level), 10/10 (100% of base power level), 18/10 (180% of base power level), and the solid points have a unit power and form a QPSK constellation. Note that a pivot point is not unique. There are 8 pivot points in 16-QAM and the pivot points form two different QPSK constellations.

In some aspects, the power (or energy) level of each modulation point may be added together for a total power. Points further from the center have a higher power level. The total power is divided by the number of modulation points to obtain the average power. A modulation point having a power level closest to (or equal to) the average power may be selected as the pivot point (one of the solid modulation points in example 600). For 64-QAM, the pivot point may be selected, for example, as $$\left(\frac{1}{\sqrt{42}}, \frac{7}{\sqrt{42}}\right) \text{or} \left(\frac{5}{\sqrt{42}}, \frac{5}{\sqrt{42}}\right) \text{or} \left(\frac{7}{\sqrt{42}}, \frac{1}{\sqrt{42}}\right),$$

and their 90°/180°/270° rotations; their average power is 25/21. For 256-QAM, the pivot point may be selected, for example, as or $$\left(\frac{7}{\sqrt{170}}, \frac{11}{\sqrt{170}}\right) \text{or} \left(\frac{11}{\sqrt{170}}, \frac{7}{\sqrt{170}}\right) \text{or} \left(\frac{1}{\sqrt{170}}, \frac{13}{\sqrt{170}}\right) \text{or} \left(\frac{13}{\sqrt{170}}, \frac{1}{\sqrt{170}}\right),$$

which all have power equal to unity. The remaining points in the first set of modulation points are obtained by rotating the pivot point by multiples of 90°.

Note that, for reference number 605, the average power of the M-QAM constellation may be computed with respect to a uniform distribution over the M-QAM constellation. However, in a scenario where the M-QAM constellation is used together with probabilistic amplitude shaping (a technique that uses the QAM points with different probabilities of being transmitted), the pivot points may be selected differently. In particular, the pivot point may be different for different shaping distributions. As shown by reference number 610, the transmitter device 510 may select a pivot point based at least in part on a parameter associated with probabilistic shaping that is applied to the second modulation symbol. For example, the parameter may be associated with a probability of transmission, and the pivot point may be selected based at least in part on the modulation point satisfying or not satisfying a probability threshold. For xCI piggybacking on a PxSCH, the power spectral density (PSD) for xCI and for PxSCH may be similar to each other, so that there is no phase continuity issue across symbols with different portions of xCI/PxSCH, as compared to a DMRS symbol.

In some aspects, the transmitter device 510 may interleave (apply an interleaver to) the I and Q branches of a first modulation symbol (e.g., for an embedded QPSK) separately, such that the I and Q branches go through independent fading realizations. Fading includes experiencing a different channel gain at a different frequency and time. For example, if a transmission goes through two different frequencies, with independent fading, the transmission will have a different channel gain in each frequency. With interleaved I and Q branches, the embedded QPSK may have a better diversity than a typical QPSK, as compared to the option of using conventional QPSK for xCI. Interleaved I and Q branches may also allow the transmitter device 510 to have a flexible xCI to PxSCH power ratio (by selecting the pivot point).

In some aspects, the transmitter device 510 may multiplex the xCI and PxSCH in the bit domain, and then proceed with the same M-QAM modulation. In this way, there is no need for the transmitter device 510 to invoke two modulators. This may reduce latency and processing resources. Alternatively, in some aspects, the transmitter device 510 may multiplex the xCI/PxSCH at the symbol level. In this scenario, the xCI may be modulated by a conventional QPSK, then rotated and scaled to yield the final constellation.

As indicated above, FIG. 6 is provided as an example. Other examples may differ from what is described with regard to FIG. 6.

Figure 7:
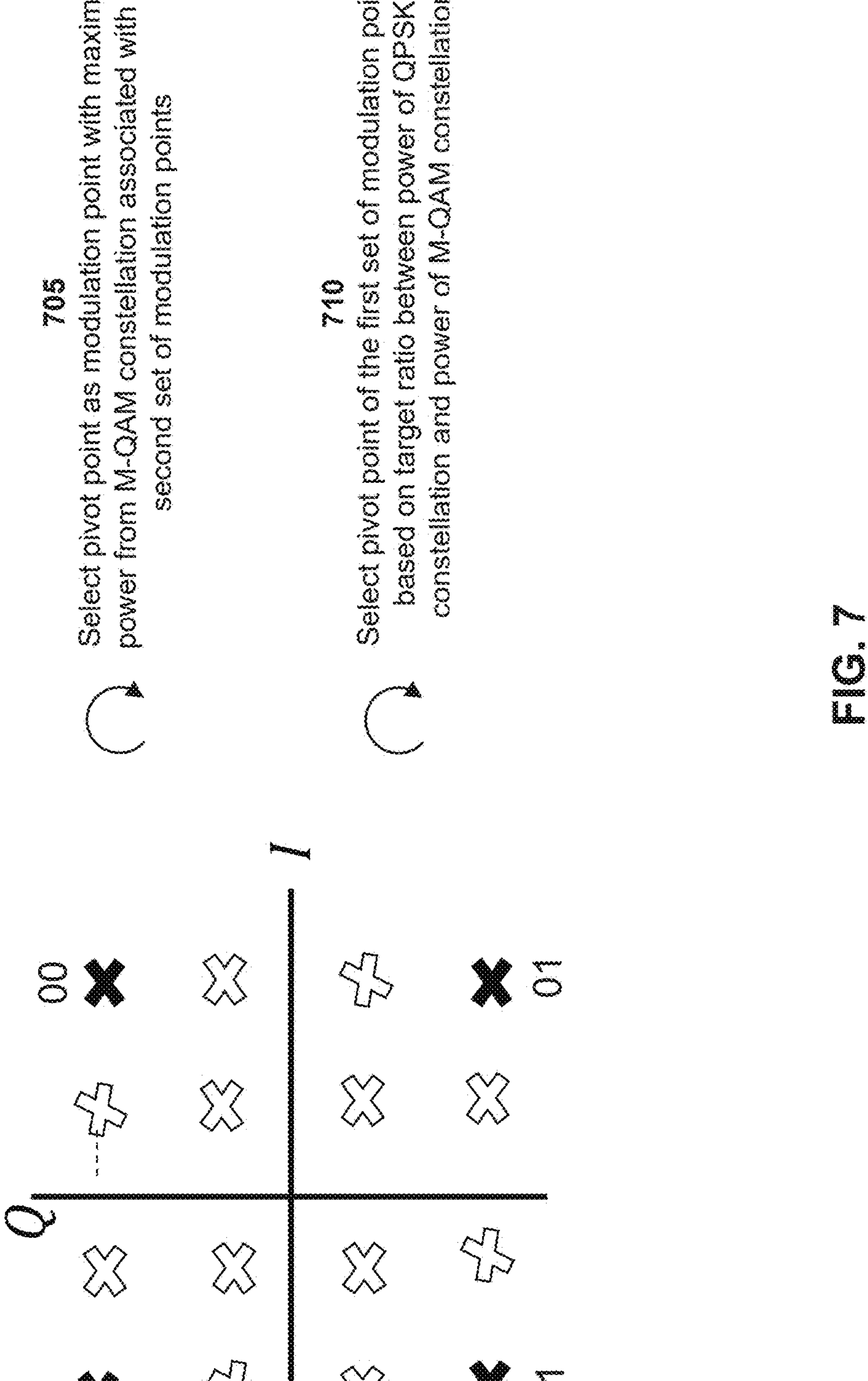
FIG. 7 is a diagram illustrating an example of pivot point selection, in accordance with the present disclosure.

FIG. 7 is a diagram illustrating an example 700 of pivot point selection, in accordance with the present disclosure.

Example 700 shows modulation points (solid points that are out-most points) that have a maximum power. As shown by reference number 705, the transmitter device 510 may select a pivot point that is a modulation point with a maximum power from a M-QAM constellation associated with the second set of modulation points. The solid modulation points in example 700 are furthest from the center and have the greatest power level. One of these solid modulation points may be selected as the pivot point.

In some aspects, as shown by reference number 710, the transmitter device 510 may select a pivot point of the first set of modulation points based at least in part on a target ratio y between the power of the QPSK constellation and the power of the M-QAM constellation. The target ratio y may be calculated, for example, as the power of the M-QAM constellation divided by the power of the QPSK constellation. The transmitter device 510 may select a pivot point whose power is similar to the target ratio $\gamma$. This allows for unequal error protection between the QPSK-modulated information and the M-QAM modulated information. As a result, processing resources are conserved. The parameter y may be communicated between the transmitter device 510 and the receiver device 520.

As indicated above, FIG. 7 is provided as an example. Other examples may differ from what is described with regard to FIG. 7.

Figure 8:
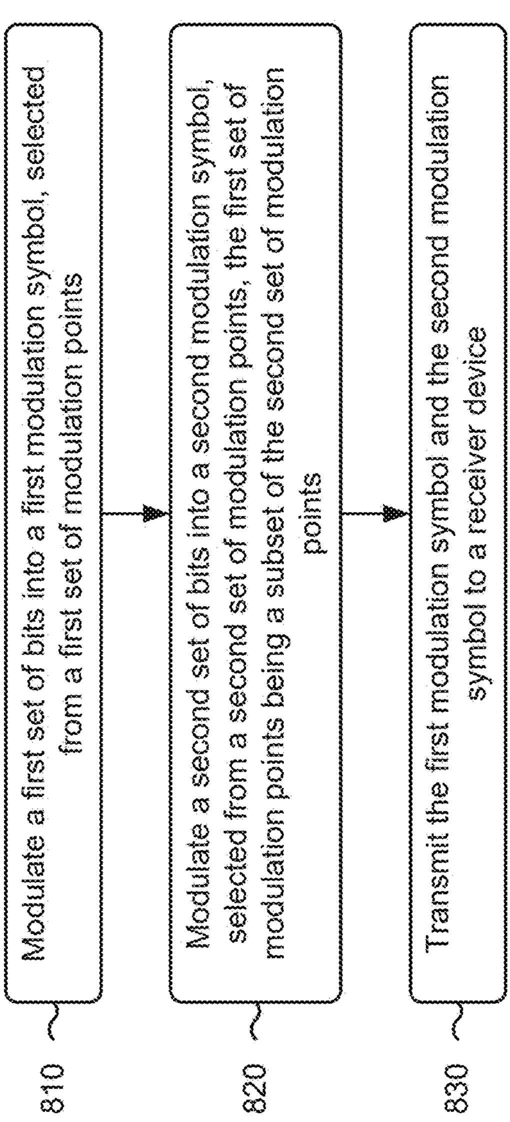
FIG. 8 is a diagram illustrating an example process performed, for example, at a transmitter device or an apparatus of a transmitter device, in accordance with the present disclosure.

FIG. 8 is a diagram illustrating an example process 800 performed, for example, at a transmitter device or an apparatus of a transmitter device, in accordance with the present disclosure. Example process 800 is an example where the apparatus or the transmitter device (e.g., transmitter device 510) performs operations associated with an embedded modulation constellation.

As shown in FIG. 8, in some aspects, process 800 may include modulating a first set of bits into a first modulation symbol, selected from a first set of modulation points (block 810). For example, the transmitter device (e.g., using communication manager 1006 or 1106, depicted in FIG. 10 or 11) may modulate a first set of bits into a first modulation symbol, selected from a first set of modulation points, as described above.

As further shown in FIG. 8, in some aspects, process 800 may include modulating a second set of bits into a second modulation symbol, selected from a second set of modulation points, the first set of modulation points being a subset of the second set of modulation points (block 820). For example, the transmitter device (e.g., using communication manager 1006 or 1106, depicted in FIG. 10 or 11) may modulate a second set of bits into a second modulation symbol, selected from a second set of modulation points, the first set of modulation points being a subset of the second set of modulation points, as described above.

As further shown in FIG. 8, in some aspects, process 800 may include transmitting the first modulation symbol and the second modulation symbol to a receiver device (block 830). For example, the transmitter device (e.g., using transmission component 1004 or 1104 and/or communication manager 1006 or 1106, depicted in FIG. 10 or 11) may transmit the first modulation symbol and the second modulation symbol to a receiver device, as described above.

Process 800 may include additional aspects, such as any single aspect or any combination of aspects described below and/or in connection with one or more other processes described elsewhere herein.

In a first aspect, the first set of modulation points includes a pivot point and remaining points.

In a second aspect, alone or in combination with the first aspect, process 800 includes selecting the pivot point based at least in part on an average power of an M-QAM constellation associated with the second set of modulation points.

In a third aspect, alone or in combination with one or more of the first and second aspects, process 800 includes selecting the pivot point based at least in part on a parameter associated with probabilistic shaping that is applied to the second modulation symbol.

In a fourth aspect, alone or in combination with one or more of the first through third aspects, process 800 includes selecting the pivot point as a modulation point with a maximum power from an M-QAM constellation associated with the second set of modulation points.

In a fifth aspect, alone or in combination with one or more of the first through fourth aspects, process 800 includes transmitting an indication of the pivot point.

In a sixth aspect, alone or in combination with one or more of the first through fifth aspects, process 800 includes Gray mapping the pivot point and the remaining points.

In a seventh aspect, alone or in combination with one or more of the first through sixth aspects, the first set of modulation points are associated with a QPSK constellation, where the second set of modulation points are associated with an M-QAM constellation, and the QPSK constellation is located within the M-QAM constellation.

In an eighth aspect, alone or in combination with one or more of the first through seventh aspects, the first set of modulation points are associated with an M-QAM constellation, and the second set of modulation points are associated with an M-squared QAM constellation.

In a ninth aspect, alone or in combination with one or more of the first through eighth aspects, the QPSK constellation is based at least in part on a pivot point of the first set of modulation points, and remaining points of the first set of modulation points are obtained by rotating the pivot point by multiples of 90 degrees.

In a tenth aspect, alone or in combination with one or more of the first through ninth aspects, process 800 includes selecting a pivot point of the first set of modulation points based at least in part on a target ratio between a power of the QPSK constellation and a power of the M-QAM constellation.

In an eleventh aspect, alone or in combination with one or more of the first through tenth aspects, an I-branch and a Q-branch of the first modulation symbol are interleaved such that the I-branch and the Q-branch have separate independent fading realizations.

In a twelfth aspect, alone or in combination with one or more of the first through eleventh aspects, the first set of bits correspond to control information, and the second set of bits are associated with a physical shared channel transmission, and process 800 includes multiplexing the control information and the physical shared channel transmission such that the control information and the physical shared channel undergo a same modulation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
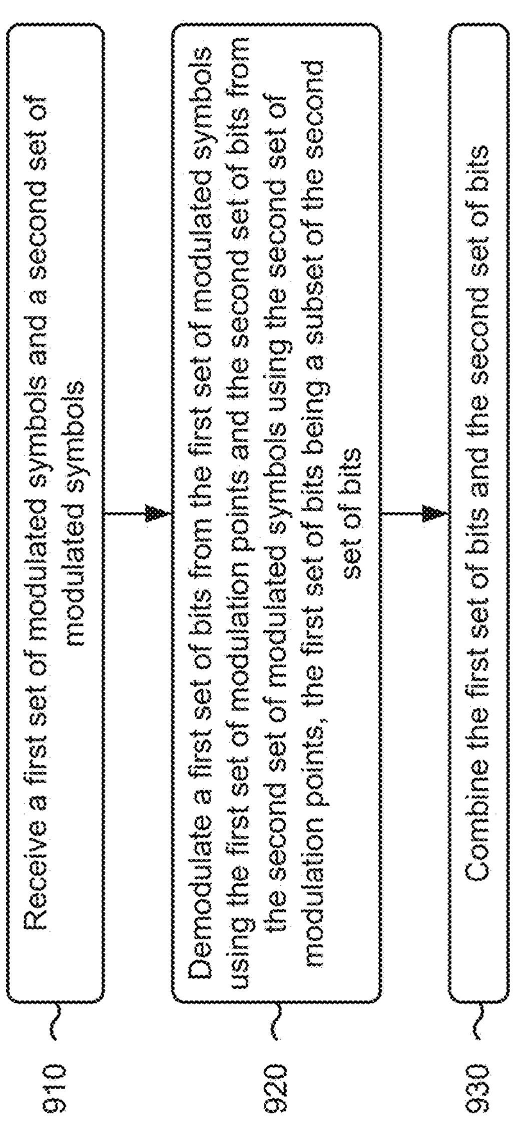
FIG. 9 is a diagram illustrating an example process performed, for example, at a receiver device or an apparatus of a receiver device, in accordance with the present disclosure.

FIG. 9 is a diagram illustrating an example process 900 performed, for example, at a receiver device or an apparatus of a receiver device, in accordance with the present disclosure. Example process 900 is an example where the apparatus or the receiver device (e.g., receiver device 520) performs operations associated with an embedded modulation constellation.

As shown in FIG. 9, in some aspects, process 900 may include receiving a first set of modulated symbols and a second set of modulated symbols (block 910). For example, the receiver device (e.g., using reception component 1002 or 1102 and/or communication manager 1006 or 1106, depicted in FIG. 10 or 11) may receive a first set of modulated symbols and a second set of modulated symbols, as described above.

As further shown in FIG. 9, in some aspects, process 900 may include demodulating a first set of bits from the first set of modulated symbols using the first set of modulation points and the second set of bits from the second set of modulated symbols using the second set of modulation points, the first set of bits being a subset of the second set of bits (block 920). For example, the receiver device (e.g., using communication manager 1006 or 1106, depicted in FIG. 10 or 11) may demodulate a first set of bits from the first set of modulated symbols using the first set of modulation points and the second set of bits from the second set of modulated symbols using the second set of modulation points, the first set of bits being a subset of the second set of bits, as described above.

As further shown in FIG. 9, in some aspects, process 900 may include combining the first set of bits and the second set of bits (block 930). For example, the receiver device (e.g., using communication manager 1006 or 1106, depicted in FIG. 10 or 11) may combine the first set of bits and the second set of bits, as described above.

Process 900 may include additional aspects, such as any single aspect or any combination of aspects described below and/or in connection with one or more other processes described elsewhere herein.

In a first aspect, the first set of modulation points are associated with an M-QAM constellation, and the second set of modulation points are associated with an M-squared QAM constellation.

In a second aspect, alone or in combination with the first aspect, an I-branch and a Q-branch of a first modulation symbol are interleaved such that the I-branch and the Q-branch have separate independent fading realizations.

In a third aspect, alone or in combination with one or more of the first and second aspects, the first set of modulation points includes a pivot point and multiple remaining points.

In a fourth aspect, alone or in combination with one or more of the first through third aspects, the first set of modulation points are associated with a QPSK constellation, where the second set of modulation points are associated with a QAM constellation, and the QPSK constellation is located within the QAM constellation.

In a fifth aspect, alone or in combination with one or more of the first through fourth aspects, the QPSK constellation is based at least in part on the pivot point.

In a sixth aspect, alone or in combination with one or more of the first through fifth aspects, the first set of bits correspond to control information, and the second set of bits are associated with a physical shared channel transmission, and the control information and the physical shared channel are multiplexed and modulated with a same modulation.

In a seventh aspect, alone or in combination with one or more of the first through sixth aspects, combining the first set of bits and the second set of bits includes generating a first LLR associated with the first set of bits and a second LLR associated with the second set of bits using an M-QAM demodulator, and combining the first LLR and the second LLR to obtain an LLR of a bit mapping to the QPSK constellation.

In an eighth aspect, alone or in combination with one or more of the first through seventh aspects, demodulating the first set of bits and the second set of bits includes demodulating the first set of bits and the second set of bits as QPSK symbols.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
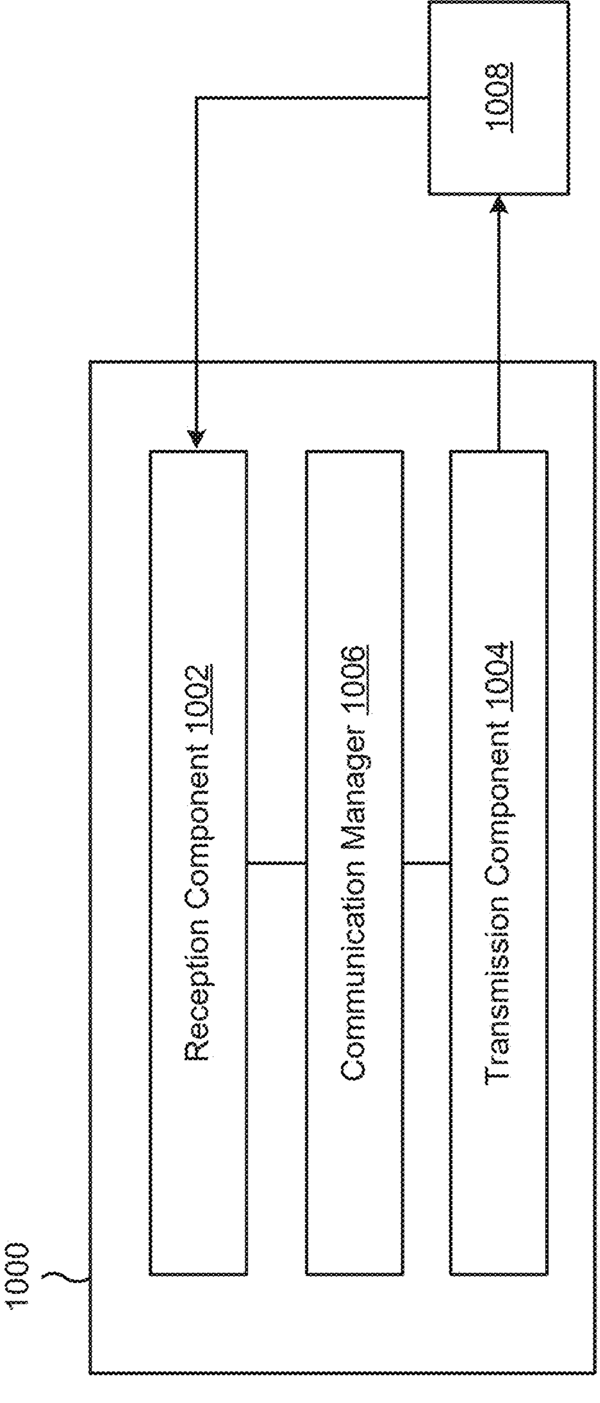
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004. The communication manager 1006 may be included in, or implemented via, a processing system (for example, the processing system 140 described in connection with FIG. 1. of the UE.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 1. Additionally, or alternatively, one or more components shown in FIG. 10 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications, and may provide the processed signals to the one or more other components of the apparatus 1000. In some aspects, the reception component 1002 may may include one or more components of the UE 120 described above in connection with FIG. 1, such as a radio, one or more RF chains, one or more transceivers, or one or more modems, each of which may in turn be coupled with one or more antennas of the UE.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications, and may transmit the processed signals to the apparatus 1008. In some aspects, the transmission component 1004 may include one or more components of the UE 120 described above in connection with FIG. 1, such as a radio, one or more RF chains, one or more transceivers, or one or more modems, each of which may in turn be coupled with one or more antennas of the UE 120 of the UE described in connection with FIG. 1. In some aspects, the transmission component 1004 may be co-located with the reception component 1002.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

In some aspects associated with a transmitter device, the communication manager 1006 may modulate a first set of bits into a first modulation symbol, selected from a first set of modulation points. The communication manager 1006 may modulate a second set of bits into a second modulation symbol, selected from a second set of modulation points, the first set of modulation points being a subset of the second set of modulation points. The transmission component 1004 may transmit the first modulation symbol and the second modulation symbol to a receiver device.

The communication manager 1006 may select the pivot point based at least in part on an average power of an M-QAM constellation associated with the second set of modulation points. The communication manager 1006 may select the pivot point based at least in part on a parameter associated with probabilistic shaping that is applied to the second modulation symbol. The communication manager 1006 may select the pivot point as a modulation point with a maximum power from an M-QAM constellation associated with the second set of modulation points. The transmission component 1004 may transmit an indication of the pivot point. The communication manager 1006 may select a pivot point of the first set of modulation points based at least in part on a target ratio between a power of the QPSK constellation and a power of the M-QAM constellation.

In some aspects associated with a receiver device, the reception component 1002 may receive a first set of modulated symbols and a second set of modulated symbols. The communication manager 1006 may demodulate a first set of bits from the first set of modulated symbols using the first set of modulation points and the second set of bits from the second set of modulated symbols using the second set of modulation points, the first set of bits being a subset of the second set of bits. The communication manager 1006 may combine the first set of bits and the second set of bits.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
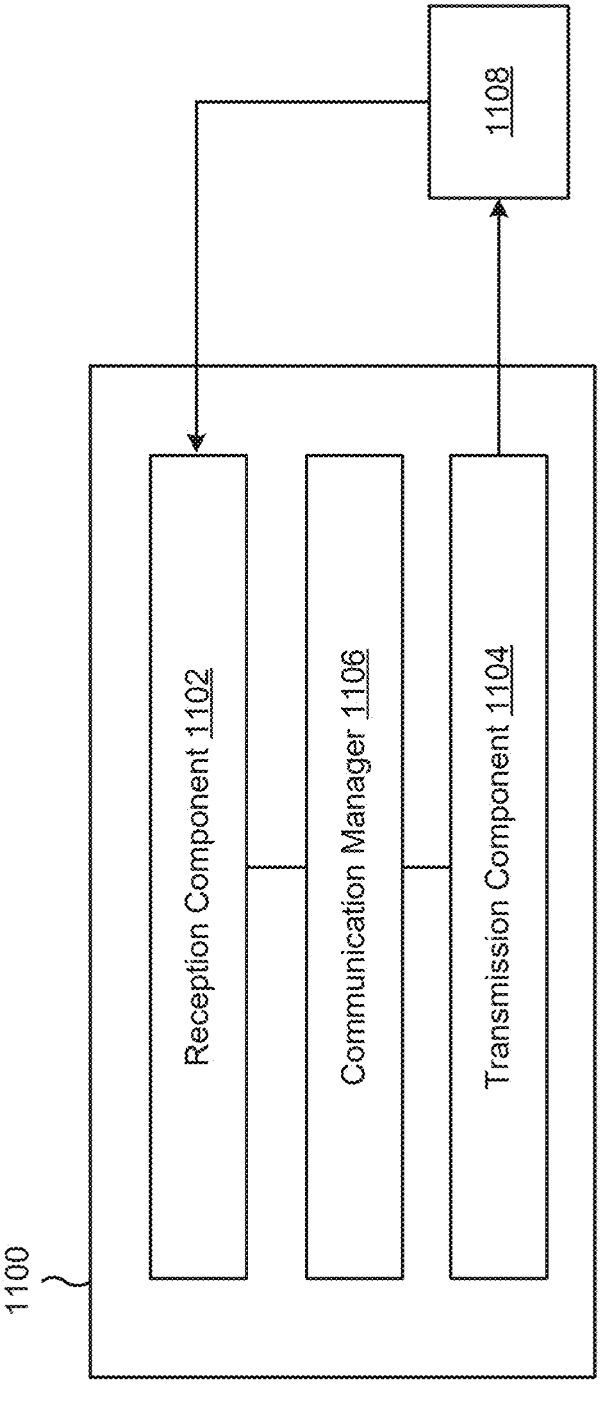
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network entity, or a network entity may include the apparatus 1100. In some aspects, the apparatus 1100 includes a reception component 1102, a transmission component 1104, and/or a communication manager 1106, which may be in communication with one another (for example, via one or more buses and/or one or more other components).

In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104. The communication manager 1106 may be included in, or implemented via, a processing system (for example, the communication manager 150 described in connection with FIG. 1. of the network entity.

In some aspects, the apparatus 1100 may be configured to perform one or more operations described herein in connection with FIGS. 1-7. Additionally, or alternatively, the apparatus 1100 may be configured to perform one or more processes described herein, such as process 800 of FIG. 8, process 900 of FIG. 9, or a combination thereof. In some aspects, the apparatus 1100 and/or one or more components shown in FIG. 11 may include one or more components of the network entity described in connection with FIG. 1. Additionally, or alternatively, one or more components shown in FIG. 11 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications, and may provide the processed signals to the one or more other components of the apparatus 1100. In some aspects, the reception component 1102 may may include one or more components of the UE 120 described above in connection with FIG. 1, such as a radio, one or more RF chains, one or more transceivers, or one or more modems, each of which may in turn be coupled with one or more antennas of the network entity.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications, and may transmit the processed signals to the apparatus 1108. In some aspects, the transmission component 1104 may include one or more components of the UE 120 described above in connection with FIG. 1, such as a radio, one or more RF chains, one or more transceivers, or one or more modems, each of which may in turn be coupled with one or more antennas of the UE 120 of the network entity described in connection with FIG. 1. In some aspects, the transmission component 1104 may be co-located with the reception component 1102.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

In some aspects associated with a transmitter device, the communication manager 1106 may modulate a first set of bits into a first modulation symbol, selected from a first set of modulation points. The communication manager 1106 may modulate a second set of bits into a second modulation symbol, selected from a second set of modulation points, the first set of modulation points being a subset of the second set of modulation points. The transmission component 1104 may transmit the first modulation symbol and the second modulation symbol to a receiver device.

The communication manager 1106 may select the pivot point based at least in part on an average power of an M-QAM constellation associated with the second set of modulation points. The communication manager 1106 may select the pivot point based at least in part on a parameter associated with probabilistic shaping that is applied to the second modulation symbol. The communication manager 1106 may select the pivot point as a modulation point with a maximum power from an M-QAM constellation associated with the second set of modulation points. The transmission component 1104 may transmit an indication of the pivot point. The communication manager 1106 may select a pivot point of the first set of modulation points based at least in part on a target ratio between a power of the QPSK constellation and a power of the M-QAM constellation.

In some aspects associated with a receiver device, the reception component 1102 may receive a first set of modulated symbols and a second set of modulated symbols. The communication manager 1106 may demodulate a first set of bits from the first set of modulated symbols using the first set of modulation points and the second set of bits from the second set of modulated symbols using the second set of modulation points, the first set of bits being a subset of the second set of bits. The communication manager 1106 may combine the first set of bits and the second set of bits.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter device, comprising: modulating a first set of bits into a first modulation symbol, selected from a first set of modulation points; modulating a second set of bits into a second modulation symbol, selected from a second set of modulation points, the first set of modulation points being a subset of the second set of modulation points; and transmitting the first modulation symbol and the second modulation symbol to a receiver device.

Aspect 2: The method of Aspect 1, wherein the first set of modulation points includes a pivot point and remaining points.

Aspect 3: The method of Aspect 2, further comprising selecting the pivot point based at least in part on an average power of an M-ary quadrature amplitude modulation constellation associated with the second set of modulation points.

Aspect 4: The method of Aspect 2, further comprising selecting the pivot point based at least in part on a parameter associated with probabilistic shaping that is applied to the second modulation symbol.

Aspect 5: The method of Aspect 2, further comprising selecting the pivot point as a modulation point with a maximum power from an M-ary quadrature amplitude modulation constellation associated with the second set of modulation points.

Aspect 6: The method of Aspect 2, further comprising transmitting an indication of the pivot point.

Aspect 7: The method of Aspect 2, further comprising Gray mapping the pivot point and the remaining points.

Aspect 8: The method of any of Aspects 1-7, wherein the first set of modulation points are associated with a quadrature phase shift keying (QPSK) constellation, wherein the second set of modulation points are associated with an M-ary quadrature amplitude modulation (M-QAM) constellation, and wherein the QPSK constellation is located within the M-QAM constellation.

Aspect 9: The method of any of Aspects 1-8, wherein the first set of modulation points are associated with an M-ary quadrature amplitude modulation (M-QAM) constellation, and the second set of modulation points are associated with an M-squared QAM constellation.

Aspect 10: The method of Aspect 9, wherein the QPSK constellation is based at least in part on a pivot point of the first set of modulation points, and wherein remaining points of the first set of modulation points are obtained by rotating the pivot point by multiples of 90 degrees.

Aspect 11: The method of Aspect 9, further comprising selecting a pivot point of the first set of modulation points based at least in part on a target ratio between a power of the QPSK constellation and a power of the M-QAM constellation.

Aspect 12: The method of any of Aspects 1-11, wherein an I-branch and a Q-branch of the first modulation symbol are interleaved such that the I-branch and the Q-branch have separate independent fading realizations.

Aspect 13: The method of any of Aspects 1-12, wherein the first set of bits correspond to control information, and the second set of bits are associated with a physical shared channel transmission, and wherein the method further comprises multiplexing the control information and the physical shared channel transmission such that the control information and the physical shared channel undergo a same modulation.

Aspect 14: A method of wireless communication performed by a receiver device, comprising: receiving a first set of modulated symbols and a second set of modulated symbols; demodulating a first set of bits from the first set of modulated symbols using the first set of modulation points and the second set of bits from the second set of modulated symbols using the second set of modulation points, the first set of bits being a subset of the second set of bits; and combining the first set of bits and the second set of bits.

Aspect 15: The method of Aspect 14, wherein the first set of modulation points are associated with an M-ary quadrature amplitude modulation (M-QAM) constellation, and the second set of modulation points are associated with an M-squared QAM constellation.

Aspect 16: The method of any of Aspects 14-15, wherein an I-branch and a Q-branch of a first modulation symbol are interleaved such that the I-branch and the Q-branch have separate independent fading realizations.

Aspect 17: The method of any of Aspects 14-16, wherein the first set of modulation points includes a pivot point and multiple remaining points.

Aspect 18: The method of Aspect 17, wherein the first set of modulation points are associated with a quadrature phase shift keying (QPSK) constellation, wherein the second set of modulation points are associated with a quadrature amplitude modulation (QAM) constellation, and wherein the QPSK constellation is located within the QAM constellation.

Aspect 19: The method of Aspect 18, wherein the QPSK constellation is based at least in part on the pivot point.

Aspect 20: The method of Aspect 18, wherein the first set of bits correspond to control information, and the second set of bits are associated with a physical shared channel transmission, and wherein the control information and the physical shared channel are multiplexed and modulated with a same modulation.

Aspect 21: The method of Aspect 18, wherein combining the first set of bits and the second set of bits includes: generating a first log-likelihood ratio (LLR) associated with the first set of bits and a second LLR associated with the second set of bits using an M-ary QAM demodulator; and combining the first LLR and the second LLR to obtain an LLR of a bit mapping to the QPSK constellation.

Aspect 22: The method of Aspect 16, wherein demodulating the first set of bits and the second set of bits includes demodulating the first set of bits and the second set of bits as QPSK symbols.

Aspect 23: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-22.

Aspect 24: An apparatus for wireless communication at a device, the apparatus comprising one or more memories and one or more processors coupled to the one or more memories, the one or more processors configured to cause the device to perform the method of one or more of Aspects 1-22.

Aspect 25: An apparatus for wireless communication, the apparatus comprising at least one means for performing the method of one or more of Aspects 1-22.

Aspect 26: A non-transitory computer-readable medium storing code for wireless communication, the code comprising instructions executable by one or more processors to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

Aspect 28: A device for wireless communication, the device comprising a processing system that includes one or more processors and one or more memories coupled with the one or more processors, the processing system configured to cause the device to perform the method of one or more of Aspects 1-22.

Aspect 29: An apparatus for wireless communication at a device, the apparatus comprising one or more memories and one or more processors coupled to the one or more memories, the one or more processors individually or collectively configured to cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a transmitter device, comprising:

one or more memories; and one or more processors, coupled to the one or more memories, individually or collectively configured to cause the transmitter device to:

modulate a first set of bits into a first modulation symbol, selected from a first set of modulation points;

modulate a second set of bits into a second modulation symbol, selected from a second set of modulation points, the first set of modulation points being a subset of the second set of modulation points; and transmit the first modulation symbol and the second modulation symbol to a receiver device.

2. The apparatus of claim 1, wherein the first set of modulation points includes a pivot point and multiple remaining points.

3. The apparatus of claim 2, wherein the one or more processors are individually or collectively configured to cause the transmitter device to select the pivot point based at least in part on an average power of an M-ary quadrature amplitude modulation constellation associated with the second set of modulation points.

4. The apparatus of claim 2, wherein the one or more processors are individually or collectively configured to cause the transmitter device to select the pivot point based at least in part on a parameter associated with probabilistic shaping that is applied to the second modulation symbol.

5. The apparatus of claim 2, wherein the one or more processors are individually or collectively configured to cause the transmitter device to select the pivot point as a modulation point with a maximum power from an M-ary quadrature amplitude modulation constellation associated with the second set of modulation points.

6. The apparatus of claim 2, wherein the one or more processors are individually or collectively configured to cause the transmitter device to transmit an indication of the pivot point.

7. The apparatus of claim 2, wherein the one or more processors are individually or collectively configured to cause the transmitter device to Gray map the pivot point and the remaining points.

8. The apparatus of claim 1, wherein the first set of modulation points are associated with a quadrature phase shift keying (QPSK) constellation, wherein the second set of modulation points are associated with an M-ary quadrature amplitude modulation (M-QAM) constellation, and wherein the QPSK constellation is located within the M-QAM constellation.

9. The apparatus of claim 1, wherein the first set of modulation points are associated with an M-ary quadrature amplitude modulation (M-QAM) constellation, and the second set of modulation points are associated with an M-squared QAM constellation.

10. The apparatus of claim 9, wherein the QPSK constellation is based at least in part on a pivot point of the first set of modulation points, and wherein remaining points of the first set of modulation points are obtained by rotating the pivot point by multiples of 90 degrees.

11. The apparatus of claim 9, wherein the one or more processors are individually or collectively configured to cause the transmitter device to select a pivot point of the first set of modulation points based at least in part on a target ratio between a power of the QPSK constellation and a power of the M-QAM constellation.

12. The apparatus of claim 1, wherein an I-branch and a Q-branch of the first modulation symbol are interleaved such that the I-branch and the Q-branch have separate independent fading realizations.

13. The apparatus of claim 1, wherein the first set of bits correspond to control information, and the second set of bits are associated with a physical shared channel transmission, and wherein the one or more processors are individually or collectively configured to cause the transmitter device to multiplex the control information and the physical shared channel transmission such that the control information and the physical shared channel undergo a same modulation.

14. An apparatus for wireless communication at a receiver device, comprising:

one or more memories; and one or more processors, coupled to the one or more memories, individually or collectively configured to cause the receiver device to:

receive a first set of modulated symbols and a second set of modulated symbols;

demodulate a first set of bits from the first set of modulated symbols using the first set of modulation points and the second set of bits from the second set of modulated symbols using the second set of modulation points, the first set of bits being a subset of the second set of bits; and combine the first set of bits and the second set of bits.

15. The apparatus of claim 14, wherein the first set of modulation points are associated with an M-ary quadrature amplitude modulation (M-QAM) constellation, and the second set of modulation points are associated with an M-squared QAM constellation.

16. The apparatus of claim 14, wherein an I-branch and a Q-branch of a first modulation symbol are interleaved such that the I-branch and the Q-branch have separate independent fading realizations.

17. The apparatus of claim 14, wherein the first set of modulation points are associated with a quadrature phase shift keying (QPSK) constellation, wherein the second set of modulation points are associated with a quadrature amplitude modulation (QAM) constellation, and wherein the QPSK constellation is located within the QAM constellation.

18. The apparatus of claim 17, wherein the first set of bits correspond to control information, and the second set of bits are associated with a physical shared channel transmission, and wherein the control information and the physical shared channel are multiplexed and modulated with a same modulation.

19. The apparatus of claim 17, wherein to combine the first set of bits and the second set of bits, the one or more processors are individually or collectively configured to cause the receiver device to:

generate a first log-likelihood ratio (LLR) associated with the first set of bits and a second LLR associated with the second set of bits using an M-ary QAM demodulator; and combine the first LLR and the second LLR to obtain an LLR of a bit mapping to the QPSK constellation.

20. The apparatus of claim 17, wherein to demodulate the first set of bits and the second set of bits, the one or more processors are individually or collectively configured to cause the receiver device to demodulate the first set of bits and the second set of bits as QPSK symbols.

21. A method of wireless communication performed by a transmitter device, comprising:

modulating a first set of bits into a first modulation symbol, selected from a first set of modulation points;

modulating a second set of bits into a second modulation symbol, selected from a second set of modulation points, the first set of modulation points being a subset of the second set of modulation points; and transmitting the first modulation symbol and the second modulation symbol to a receiver device.

22. The method of claim 21, wherein the first set of modulation points includes a pivot point and remaining points.

23. The method of claim 22, further comprising selecting the pivot point based at least in part on an average power of an M-ary quadrature amplitude modulation constellation associated with the second set of modulation points.

24. The method of claim 22, further comprising selecting the pivot point based at least in part on a parameter associated with probabilistic shaping that is applied to the second modulation symbol.

25. The method of claim 22, further comprising selecting the pivot point as a modulation point with a maximum power from an M-ary quadrature amplitude modulation constellation associated with the second set of modulation points.

26. The method of claim 22, further comprising transmitting an indication of the pivot point.

27. The method of claim 22, further comprising Gray mapping the pivot point and the remaining points.

28. The method of claim 22, further comprising selecting a pivot point of the first set of modulation points based at least in part on a target ratio between a power of the QPSK constellation and a power of an M-ary quadrature amplitude modulation constellation.

29. The method of claim 21, wherein an I-branch and a Q-branch of the first modulation symbol are interleaved such that the I-branch and the Q-branch have separate independent fading realizations.

30. A method of wireless communication performed by a receiver device, comprising:

receiving a first set of modulated symbols and a second set of modulated symbols;

demodulating a first set of bits from the first set of modulated symbols using the first set of modulation points and the second set of bits from the second set of modulated symbols using the second set of modulation points, the first set of bits being a subset of the second set of bits; and combining the first set of bits and the second set of bits.

* * * * *